United States Patent
Jagota et al.

(10) Patent No.: US 11,372,928 B2
(45) Date of Patent: Jun. 28, 2022

(54) ADAPTIVE MATCH INDEXES

(71) Applicant: salesforce.com, inc., San Francisco, CA (US)

(72) Inventors: Arun Kumar Jagota, Sunnyvale, CA (US); Ajitesh Jain, San Mateo, CA (US); Rahul Mathias Madan, Sunnyvale, CA (US); Shravani Madhavaram, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 332 days.

(21) Appl. No.: 16/775,611

(22) Filed: Jan. 29, 2020

(65) Prior Publication Data
US 2021/0232637 A1 Jul. 29, 2021

(51) Int. Cl.
| | |
|---|---|
| G06F 16/90 | (2019.01) |
| G06N 20/00 | (2019.01) |
| G06F 16/903 | (2019.01) |
| G06F 16/901 | (2019.01) |

(52) U.S. Cl.
CPC ...... *G06F 16/90339* (2019.01); *G06F 16/902* (2019.01); *G06F 16/90348* (2019.01); *G06N 20/00* (2019.01)

(58) Field of Classification Search
CPC .......... G06F 16/902; G06F 16/90348
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

*Primary Examiner* — Kristopher Andersen
(74) *Attorney, Agent, or Firm* — Dergosits & Noah LLP; Todd A. Noah

(57) ABSTRACT

Determine first count of first records storing first value in first field, second count of second records storing second value in second field, third count of third records storing third value in third field. Determine count threshold using first, second and third counts, dispersion measure based on dispersion of values stored in second field by first records and other dispersion measure based on other dispersion of values stored in third field by first records. Train machine-learning model to determine dispersion measure threshold based on dispersion and other dispersion measures. If first count is greater than count threshold, and dispersion measure is greater than dispersion measure threshold, create match index based on first and second fields. Receive prospective record storing first value in first field, second value in second field. Use match index to identify record storing first value in first field, second value in second field as matching prospective record.

20 Claims, 8 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang |
| 6,601,087 B1 | 7/2003 | Zhu |
| 6,604,117 B2 | 8/2003 | Lim |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2016/0063389 A1* | 3/2016 | Fuchs .................. G06N 7/005 706/12 |
| 2018/0101783 A1* | 4/2018 | Savkli .................. G06K 9/6224 |
| 2018/0165354 A1* | 6/2018 | Jagota .................. G06F 16/31 |

\* cited by examiner

ADAPTIVE MATCH INDEXES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database can store digital objects or records for each person or organization that may be able to help in achieving a goal. Each record can consist of a few standard fields, such as fields that store a first name, a last name, an organization name, a job title, a street address, a telephone number, a mobile phone number, an e-mail address, a fax number, and a website address. For performant matching of a newly acquired record against a large database of existing records, the database of existing records needs to be indexed. A database system can use match indexes to generate match keys that quickly identify database records that are candidates for matching an acquired record, which may be referred to as a suspect record or a prospect record. The design of match indexes can take recall and precision into consideration. Recall can be a retrieval completeness measure based on the number of matching records that are retrieved by a database system relative to the number of actual matching records stored by the database system. Precision can be a retrieval accuracy measure based on the number of matching records retrieved by a database system relative to the number of records retrieved by the database system. To achieve the ideal of 100% recall, a database system may need to treat every record in a database as a candidate record for matching every suspect record, which typically is not feasible, performance-wise. At the other extreme of the recall/precision spectrum, a database system can quickly search candidate records by using narrowly focused match indexes for generating match keys which identify only matching records, but narrowly focused match indexes may result in generating match keys that fail to identify some matching records in the database.

A data platform enables data providers, such as data marketplace vendors and crowd-sourced database system users, to provide their datasets to organizations via the platform. After an organization acquires a dataset from the platform, the organization's database system matches the acquired dataset's records to the appropriate type(s) of the organization's existing records, and uses suitable fields of data from the acquired records to update or add to the organization's existing database records that match the acquired records, thereby enriching the organization's existing database records.

A database system's process that determines whether acquired records sufficiently match existing database records may be an intensive process that matches multiple values between these corresponding records, thereby consuming a significant amount of system resources. Consequently, a database system can initially identify any existing database records that match only one corresponding value stored by an acquired record, in a shallow matching process that consumes a relatively limited amount of system resources. Then the database system can apply the intensive multiple-value matching process to each of the relatively small number of shallow matching records in the existing database records, thereby collectively reducing system resource consumption. Therefore, the database system can create a match index that uses values stored by existing database records or by acquired records to create match keys, and then use the match keys to identify the existing database records that shallow match any acquired records.

In some situations, the database system uses a single match index to create match keys that identify a relatively large number of existing database records that shallow match an acquired record. In this situation, if the database system applies the intensive multiple-value deep matching process to each of the relatively large number of existing database records that shallow match the acquired record, processing the relatively large number of existing database records would consume a significant amount of system resources. Therefore, the database system can create multiple match indexes that use the existing database records' values or the acquired records' values to create multiple types of match keys, and then use these match keys to identify a relatively small number of the existing database records that shallow match the acquired records.

The database system can use a combination of match indexes to create match keys based on a combination of normalized values stored by record fields. For example, if an acquired record contains the fields for an organization name, a street address, a telephone number, and a domain, then a database system can use a combination of match indexes to create a match key based on normalized values of fields for the organization name and the domain, or the organization name and the phone number, or the domain. The set of match indexes may be defined as XML in a file called Indexmaster which may be defined for each data vendor. An example of Indexmaster for a data vendor is;

```
<index name="DOMAIN_COUNTRY">
    <normalizers>
        <normalizer field="DOMAIN"
   class="com.salesforce.ddc.dc_datajourney.normalize.index.IndexDomainNormalizer" />
        <normalizer field="COUNTRY"
            class="com.salesforce.ddc.dc_datajourney.normalize.index.PlainNormalizer" />
    </normalizers>
    <weight>100</weight>
```

```
</index>
<index name="DOMAIN">
  <normalizers>
    <normalizer field="DOMAIN"
class="com.salesforce.ddc.dc_datajourney.normalize.index.IndexDomainNormalizer" />
  </normalizers>
  <weight>1</weight>
</index>
```

The above XML configuration file specifies two match indexes: a first match index that is based on a combination of the domain field and the country field, and a second match index that is based on just the domain field. The database system can use the IndexDomainNormalizer class to normalize the values stored in the domain field and the PlainNormalizer class to normalize the values stored in the country field. Normalizers help in identifying the main component of the value in a field. For example, the IndexDomainNormalizer class removes the beginning protocol "http://www." from the value stored by the domain field, and returns the main part of the uniform resource locator. An index normalizer can generate different kinds of match keys for other record fields, such as a phonetic match key which helps to match similar sounding organization names, such as Printronics and Printronix. An index service can use an index master to generate match keys. During the ingestion time, the data is processed through the same index service as during the matching time, which helps to use match indexes to generate match keys consistently during storing times as well as retrieving times. The following example depicts a record and match keys that may be generated by using the above example XML configuration file for the domain-country match index and the domain match index.:

```
{
"COMPANY NAME": "wayne county third circuit court",
"DOMAIN": "3rdcc.org",
"COUNTRY": "United States",
"PRIMARY_ID": "zvWTXIQx7WSCSybCWDduOQ==",
"metadata_id": "BOMBORA",
"input_source_index_sis": "1486",
"dyn_pid_ss": "zvWTXIQx7WSCSybCWDduOQ==",
"Industry_sis": "government relations",
"Category_sis": "patient management",
"Topic_sis": "managed care",
"organizationNameTrieExpansions_ss": "wayne county third circuit court",
"Topic_topic_facet": "managed care",
"unique_record_id": "3rdccBBmn8vFfpMbFn54YGFLDxUlg==",
"match_key": ["3rdcc.org@unitedstates 3rdcc.org"],
"_version_":1569055101076635648,
"timestamp": "2017-06-02T01:39:10.923Z"},
```

The match_key field includes the different match keys created for the record. The database system can use match indexes to generate match keys that significantly reduce the number of candidate records that might match an acquired record, such that the database system deep matches the acquired record against a relatively few candidate records instead of deep matching the acquired record against the entire database of records.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
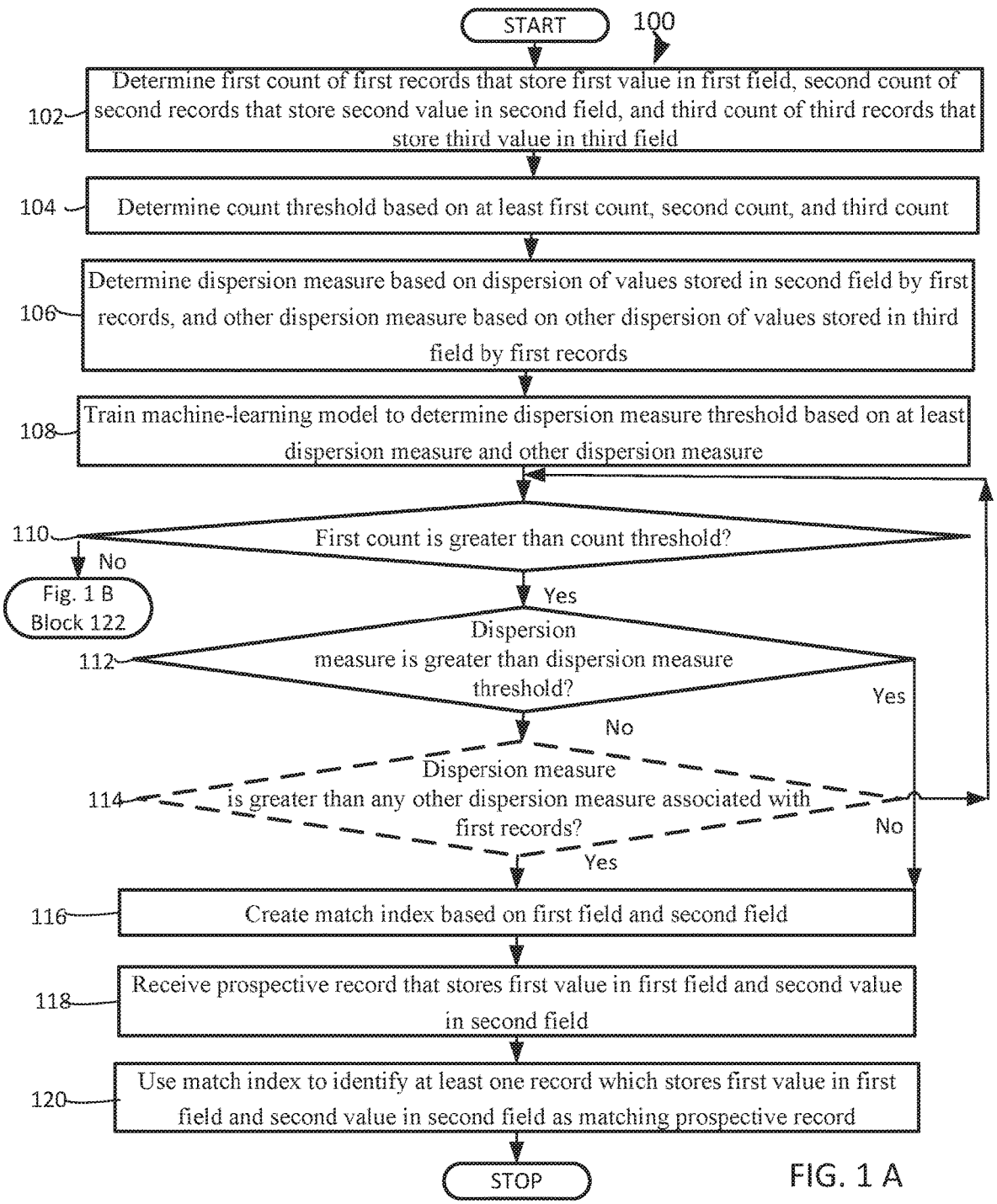
FIGS. 1A-B are an operational flow diagram illustrating a high-level overview of a method for adaptive match indexes, in an embodiment.
Figure 1:
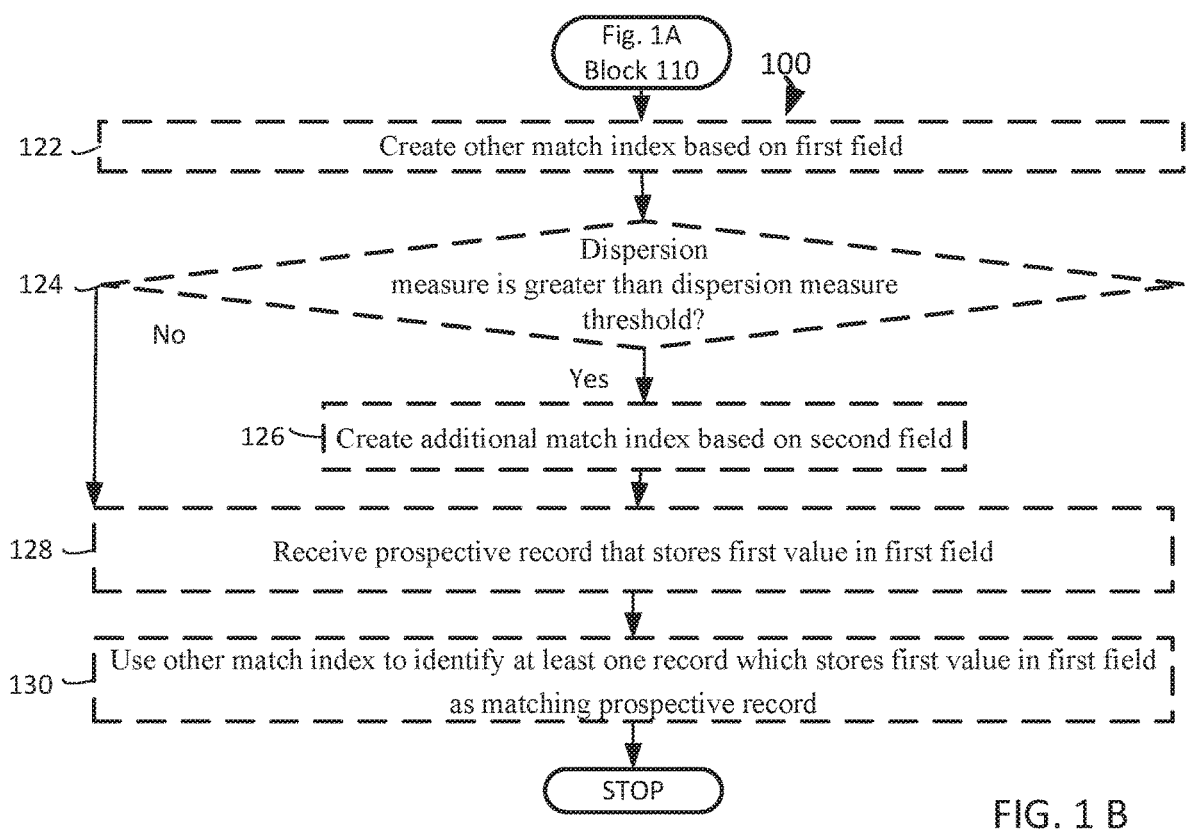

A system administrator is required to configure match indexes and the weight of each match index to generate match keys that significantly reduce the number of existing database records that are deep matched against an acquired record. However, the time-consuming and error-prone manual selection of a record field to create a match index may not always enable the drastic reduction of the number of candidate records. For example, the selection of the state field to create a state match index for one data vendor's dataset of records would not enable the reduction of the number of candidate records for another data vendor's dataset which stores records for companies that are located only in the state of California. In another example, while the selection of the telephone number field to create a telephone number match index would enable the reduction of the number of candidate records, the use of such a narrowly focused match index may fail to identify some matching records. Furthermore, the selection of a record field to create a multi-value match index that is related to another match index may not enable the drastic reduction of the number of candidate records. For example, if a database system already uses a organization name match index and a data vendor's dataset stores records for organizations that are located in only one country, the use of the country field to create an organization@country match index would not enable the reduction of the number of candidate records for the data vendor's dataset.

Some match indexes are subject to data related issues, such as missing fields, and duplicative indexes. For example, a database system applies the match indexes organizationname@city, domain @ city, domain @ zip, zip to an acquired record that stores ORGANIZATION: Salesforce.com|DOMAIN: sfdc.com|CITY: San Francisco|ZIP: 94105 to generate the match keys salesforcecom@sanfrancisco, salesforce@sanfrancisco, sfdc@sanfrancisco, sfdc@94105, and 94105. When applying these match indexes to an acquired record that stores ORGANIZATION: San Francisco Chronicle, |CITY: San Francisco, a database system generates match keys that include sanfranciscochronicle@sanfrancisco and sanfrancisco@sanfrancisco. When applying these match indexes to an existing record that stores ORGANIZATION: San Francisco Soup Company, |CITY: San Francisco, the database system generates match keys that include sanfranciscosoupcompany@sanfrancisco and sanfrancisco@sanfrancisco. The match keys sanfrancisco@sanfrancisco generated for the acquired record and for the existing record are duplicative value match keys that the database system may generate for hundreds of records for companies that are located in the city San Francisco and begin their names with San Francisco. The use of such duplicative value match keys may not sufficiently reduce the number of candidate records.

In accordance with embodiments described herein, there are provided systems and methods for adaptive match indexes. A system determines a first count of first records that store a first value in a first field, a second count of second records that store a second value in a second field, and a third count of third records that store a third value in a third field. The system determines a count threshold based on at least the first count, the second count, and the third count. The system determines a dispersion measure based on a dispersion of values stored in the second field by the first records, and another dispersion measure based on another dispersion of values stored in the third field by the first records.

Then the system trains a machine-learning model to determine a dispersion measure threshold based on at least the dispersion measure and the other dispersion measure. If the first count is greater than the count threshold, and if the dispersion measure is greater than the dispersion measure threshold, the system creates a match index based on the first field and the second field. The system receives a prospective record that stores the first value in the first field and the second value in the second field, and uses the match index to identify at least one record which stores the first value in the first field and the second value in the second field as matching the prospective record.

For example, a database system has a database record that stores Starbucks in the organization name field, One Market St. in the address field, 650-212-4567 in the phone field, San Francisco in the city field, and California in the state field. The database system counts 243 of its records that store Starbucks. in the organization name field, 56 records that store One Market St. in the address field, 2 records that store 650-212-4567 in the phone field, 499 records that store San Francisco in the city field, and 997 records that store California in the state field. The database system calculates a count threshold of 99.5 based on all the counts of records that store the same value in the same record field. The database system also calculates an entropy of 2.39 based on the dispersion of 243 different values stored in the address field by the 243 Starbucks records and an entropy of 2.47 based on the dispersion of 293 different values stored in the primary and secondary phone fields by the 243 Starbucks records. The database system additionally calculates an entropy of 1.67 based on the dispersion of 47 different values stored in the city field by the 243 Starbucks records and an entropy of 1.28 based on the dispersion of 19 different values stored in the state field by the 243 Starbucks records, Then the database system trains a machine-learning model to learn an entropy threshold, and it learns an entropy threshold of 1.95 based on all of the calculated entropies. Since the count of the 243 Starbucks records is greater than the count threshold of 99.5, and the entropy of 2.47 for the 293 different values stored in the primary and secondary phone fields by the 243 Starbucks records is greater than the entropy threshold of 1.95. the database system combines the organization name field with the phone field to create an organization name-phone match index for the 243 Starbucks records, Since the count of the 243 Starbucks records is greater than the count threshold of 99.5, and the entropy of 2.39 for the 243 different values stored in the address field by the 243 Starbucks records is greater than the entropy threshold of 1.95, the database system also combines the organization name field with the address field to create an organization name-address match index for the 243 Starbucks records. Next, the database system applies the organization name-phone match index and the organization name-address match index to the 243 Starbucks records to create 243 Starbucks match keys for each match index, including the match key Starbucks@1market. The database system receives a new record that stores Starbucks in the organization name field and One Market St. in the address field, and applies the organization name-phone match index and the organization name-address match index to the new record, which generates the match key Starbucks@1market that is used to identify the database system's existing record which stores Starbucks in the organization name field and One Market St. in the address field as matching the new record. These adaptive match indexes automate the process of creating match indexes by training machine learning model(s) which are queried during ingestion and serving time.

Systems and methods are provided for adaptive match indexes. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for adaptive match indexes will be described with reference to example embodiments. The following detailed description will first describe a method for adaptive match indexes.

While one or more implementations and techniques are described with reference to an embodiment in which adaptive match indexes are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIGS. 1A-B are an operational flow diagram illustrating a high-level overview of a method 100 for adaptive match indexes. A first count of first records that store a first value in a first field, a second count of second records that store a second value in a second field, and a third count of third records that store a third value in a third field are determined, block 102. The system counts each number of records that store the same value in the same field, so that the system can determine which match indexes for these numbers of records would result in shallow matching too many records. For example, and without limitation, this can include the database system counting 243 of its records that store Starbucks. in the organization name field, 56 records that store One Market St. in the address field, 2 records that store 650-212-4567 in the phone field, 499 records that store San Francisco in the city field, and 997 records that store California in the state field. This counting occurs after the database system read a database record that stores Starbucks in the organization name field, One Market St. in the address field, 650-212-4567 in the phone field, San Francisco in the city field, and California in the state field, a database record that stores Salesforce in the organization name field, sfdc.com in the domain field, One Market St. in the address field, San Francisco in the city field, and 94105 in the zip code field, and a database record that stores Amazon in the organization name field and 415-668-6000 in the phone field.

A count can be an arithmetical value, expressed by a word, symbol, or figure, representing a particular quantity and used in making calculations. A record can be the storage of at least one value in a persistent form. A value can be a symbol on which operations are performed by a computer, being stored and transmitted in the form of electrical signals and recorded on magnetic, optical, or mechanical recording media. A field can be a part of a record, representing an item of data.

After counting each number of records that store the same value in the same field, a count threshold is determined based on at least the first count, the second count, and the third count, block 104. The system determines a count threshold for the counts of each number of records that store the same value in the same field, so that the system can create multi-field match indexes for the numbers of records that would result in shallow matching too many records because they exceed the count threshold. By way of example and without limitation, this can include the database system calculating a count threshold of 99.5 based on all the counts of records that store the same value in the same field. A count threshold can be the numerical magnitude that must be met or exceeded for a certain reaction, phenomenon, result, or condition to occur or be manifested.

The count threshold may be learned by any suitable machine learning model or based on historical data associated with recall and precision of match indexes used to match records. For example, a machine learning model determines the count threshold of 99.5 by assessing the numbers of the largest counts of records that store the same value in the same field, and the system response times when retrieving these sets of records, and learning that response time begin to be adversely effected when more than 100 records are retrieved during a single operation. In another example, a system administrator inputs a count threshold of 99.5 based on experimental measurements of recall and precision when various match indexes were used to match records. A machine learning model can be a computer system that scientifically studies algorithms and/or statistical models to perform a specific task effectively by relying on patterns and inference instead of using explicit instructions. Historical data can be information that was recorded in the past. A match index can be a set of items each of which specifies one of the records of a database and contains information about its address.

In addition to calculating a count threshold, a dispersion measure is determined based on a dispersion of values stored in the second field by the first records, and another dispersion measure is determined based on another dispersion of values stored in the third field by the first records, block 106. The system identifies a set of records with a primary field, and determines how widely dispersed values are in the record's secondary fields, so that the system can select a secondary field with widely dispersed values to combine with the primary field to create a multi-field match index that significantly reduces the number of shallow matching records that are retrieved. In embodiments, this can include the database system calculating an entropy of 2.39 based on the dispersion of 243 different values stored in the address field by the 243 records that store Starbucks in the organization name field and an entropy of 2.47 based on the dispersion of 293 different values stored in the primary and secondary phone fields by the 243 Starbucks records. In another example, the database system calculates an entropy of 1.67 based on the dispersion of 47 different values stored in the city field by the 243 Starbucks records and an entropy of 1.28 based on the dispersion of 19 different values stored in the state field by the 243 Starbucks records. In yet another example, the database system calculates an entropy of 1.92 for the 83 different values stored in the address field by the 102 records that store Salesforce in the organization name field. In an additional example, the database system calculates an entropy of 1.99 for the 97 different values stored in the phone field by 97 Amazon records. A dispersion can be the extent to which a distribution of values is stretched or squeezed across a range of values. A dispersion measure can be an indication of assessing the extent to which a distribution of values is stretched or squeezed across a range of values.

While examples describe the counts of records that store the same value in the same field and the calculation of dispersion measures as occurring separately, the database system may determine all of these counts and all of these dispersion measures via a single pass over a database. Although examples describe the dispersion measure as entropy, the database system may use any suitable dispersion measure. The entropy may be defined as Entropy: $-\Sigma(x/y)*\log(x/y)$. For example, 102 records store Salesforce in the organization name field, and 53 of these records store San Francisco in the city field, 12 of these records store Atlanta in the city field, and 37 of these records store New York in the city field. Therefore, using the above entropy equation to calculate the entropy of the city field for the 102 Salesforce records results in entropy=$-[(53/102)*\log(53/102)+(12/102)*\log(12/102)+(37/102)*\log(37/102)]=0.42$.

Following the calculation of multiple dispersion measures, a machine-learning model is trained to determine a dispersion measure threshold based on at least the dispersion measure and the other dispersion measure, block 108. The system trains a machine learning system to learn a dispersion threshold which is used for selecting which secondary field stores values which are sufficiently dispersed for the secondary field to be combined with the primary field to create a multi-field match index. For example, and without limitation, this can include the database system training a machine-learning model to learn an entropy threshold, and it learns an entropy threshold of 1.95 based on all of the calculated entropies. A dispersion measure threshold can be the numerical magnitude that must be met or exceeded for a certain reaction, phenomenon, result, or condition to occur or be manifested.

Having calculated a count threshold, whether a first count is greater than the count threshold is determined, block 110. The system determines whether the count of records that store a specific value in the primary field is more the count threshold, which would be enough to justify using the primary field to create a multi-field match index. By way of example and without limitation, this can include the database system determining whether the count of the 243 Starbucks records is greater than the count threshold of 99.5. In another example, the database system determines whether the count of the 102 Salesforce records is greater than the count threshold of 99.5. In yet another example, the database system determines whether the count of the 97 Amazon records is greater than the count threshold of 99.5. If the first count is greater than the count threshold, the method 100 continues to block 112 to determine whether the dispersion measure is greater than the dispersion measure threshold. If the first count is not greater than the count threshold, the method 100 proceeds to block 122 to create a match index which is based on the first field only.

If the first count is greater than the count threshold, whether the dispersion measure is greater than the dispersion measure threshold is determined, block 112. The system determines whether the values stored by a secondary field are dispersed more than the dispersion threshold, which would be dispersed enough to justify combining the secondary field with the primary field to create a multi-field match index. In embodiments, this can include the database system determining whether any of the entropies for the 243 Starbucks records is greater than the entropy threshold of 1.95 because the count of the 243 Starbucks records is greater than the count threshold of 99.5. If the dispersion measure is not greater than the dispersion measure threshold, the method 100 continues to block 114 to determine whether the dispersion measure is greater than any other dispersion measure associated with the first records. If the dispersion measure is greater than the dispersion measure threshold, the method 100 proceeds to block 116 to create a match index based on the first field and the second field.

If the dispersion measure is not greater than the dispersion measure threshold, whether a dispersion measure is greater than any other dispersion measure associated with the first records is optionally determined, block 114. The system can determine whether the values stored by a secondary field are the most widely dispersed of all the secondary fields' values, which could justify combining the secondary field with the primary field to create a multi-field match index, even if the dispersion of the secondary field's values is less than the dispersion threshold. For example, and without limitation, this can include the database system determining whether the entropy of 1.92 for the 83 different values stored in the address field by the 102 records that store Salesforce in the organization name field, which is less than the entropy threshold of 1.95, is greater than any of the entropies for the 102 Salesforce records. Since the count of the 102 Salesforce records is greater than the count threshold of 99.5, whichever secondary field that has the largest entropy for these records is combined with the organization name field to create a multi-field match index, even if the largest entropy is less than the entropy threshold. If the dispersion measure is greater than any other dispersion measure associated with the first records, the method 100 continues to block 116 to create the match index that is based on the first field and the second field. If the dispersion measure is not greater than any other dispersion measure associated with the first records, the method 100 returns to block 110 to continue evaluating fields until an entropy for a field is identified as large enough to justify using the field to create a multi-field match index.

If the dispersion measure is greater than the dispersion measure threshold, a match index is created based on the first field and the second field, block 116. The system combines the primary field with a secondary field to create an adaptive multi-field match index because the count of records that store the specific value in the primary field is more the count threshold, and the values in the secondary field are dispersed more than the dispersion threshold, such that the adaptive multi-field match index will significantly reduce the number of records retrieved. By way of example and without limitation, this can include the database system combining the organization name field and the address field to create an organization name-address match index for the 243 Starbucks records, because the entropy of 2.39 for the 243 different values stored in the address field by the 243 Starbucks records is greater than the entropy threshold of 1.95. Then the database system applies the organization name-address match index to the 243 Starbucks records to create 243 Starbucks address match keys, including the match key Starbucks@1market. Similarly, the database system also combines the organization name field and the phone field to create an organization name-phone match index for the 243 Starbucks records, because the entropy of 2.47 for the 293 different values stored in the primary and secondary phone fields by the 243 Starbucks records is greater than the entropy threshold of 1.95. Then the database system applies the organization name-phone match index to the 243 Starbucks records to create 243 Starbucks phone match keys, including the match key Starbucks@650-212.

After creating a match index, a prospective record is received which stores the first value in the first field and the second value in the second field, block 118. The system receives new records that might be matched to existing records by using the adaptive multi-field match index. In embodiments, this can include the database system receiving a first new record that stores Starbucks in the organization name field and One Market St. in the address field. In another example, the database system receives a second new record that stores Salesforce in the organization name field and One Market St. in the address field. A prospective record can be at least one stored value that could potentially be stored in a database or dataset.

Following receipt of the prospective record, the match index is used to identify at least one record which stores the first value in the first field and the second value in the second field as matching the prospective record, block 120. Using the match index to identify at least one record which stores the first value in the first field and the second value in the second field as matching the prospective record may include using the match index to create a match key based on the first value and the second value, and using the match key to match at least one record to the prospective record. The system uses an adaptive multi-field match index to match new records to existing records. For example, and without limitation, this can include the database system applying the organization name-address match index to the first new record to generate the match key Starbucks@1market that is used to identify the database system's existing record which stores Starbucks in the organization name field and One Market St. in the address field as matching the first new record. Similarly, the database system also applies the organization name-phone match index to the first new record to generate the match key Starbucks@650212 that is used to identify the database system's existing record which stores Starbucks in the organization name field and 650-212-4567 in the phone field as matching the first new record. In another example, the database system applies the organization name-address match index to the second new record to generate the match key Salesforce@1market that is used to identify the database system's existing record which stores Salesforce in the organization name field and One Market St. in the address field as matching the second new record.

A match key can be a value of a field in a record that is used to lookup the record. Using the match index to identify at least one record which stores the first value in the first field and the second value in the second field as matching the prospective record may include using the match index instead of an alternative match index, which is based on a weight associated with the match index and an alternative weight associated with the alternative match index. A weight can be the ability of something to influence a decision or an action. An enterprise search platform, such as SOLR, can assign the weights of the adaptive multi-field match indexes, which are inversely proportional to the approximate number of candidate records expected to be retrieved, The weight may be based on the first count relative to the dispersion measure, such as the frequency for a field divided by 2 raised to the power of the entropy for the field. For example, the weight for the organization name-phone match index is the frequency divided by 2 raised to the power of the entropy, which is 293 phone numbers stored by the 243 Starbucks records, divided by 2 raised to the power of the phone field's entropy of 2.46, which equals 293 divided by 5.5, which is a weight of 53.3 for the organization name-phone match index. In another example, the weight for the organization name-address match index is the frequency divided by 2 raised to the power of the entropy, which is 243 addresses stored by the 243 Starbucks records, divided by 2 raised to the power of the address field entropy of 2.39, which equals 243 divided by 5.24, which is a weight of 46.4 for the organization name-address match index. Therefore, when the database system selects a match index to apply to a prospective record for matching existing records, the database system applies the weight of 53.3 to the organization name-phone match index and the weight of 46.4 to the organization name-address match index, which would result in the database system selecting to use the organization name-phone match index and the organization name-address match index before selecting to use the single field match index for either organization name, phone, or address. Then the method 100 stops.

If the first count is not greater than the count threshold, another match index is optionally created based on the first field, block 122. The system can use the primary field to create a single field match index if the count of records that store a specific value in the primary field is not more the count threshold, such that the creation of a multi-field index is not needed for this relatively small number of records. By way of example and without limitation, this can include the database system creating an organization name match index for the 97 records that store Amazon in the organization name field, and applying the organization name match index to these records to create 97 Amazon match keys, because the count of 97 Amazon records is not greater than the count threshold of 99.5. In another example, the database system creates an address match index for the 243 records that store Starbucks in the organization name field, and applies the address match index to these records to create 243 address match keys, including the match key 1market, because the count of 56 1market records is not greater than the count threshold of 99.5. However, the database system might not create a phone match index for the 1 record that stores Starbucks in the organization name field and 650-212-4567 in the phone field if the count of 1 is insufficient for creating a match index.

Having created a match index that may be used to match prospective records with existing records, whether the dispersion measure is greater than the dispersion measure threshold is optionally determined, block 124. The system can determine whether the values in a secondary field are dispersed more than the dispersion threshold, which could be dispersed wide enough to justify using the secondary field to create another single-field match index. In embodiments, this can include the database system determining whether any of the entropies for the 97 Amazon records is greater than the entropy threshold of 1.95 because the count of the 97 Amazon records is less than the count threshold of 99.5. If the dispersion measure is greater than the dispersion measure threshold, the method 100 continues to block 126 to create an additional match index based on the second field. If the dispersion measure is not greater than the dispersion measure threshold, the method 100 may continue evaluating fields to determine whether any entropy for any field justifies using the field to create another single-field match index, and then proceed to block 128 to receive a prospective record.

If the dispersion measure is greater than the dispersion measure threshold, an additional match index is optionally created based on the second field, block 126. The system can use a secondary field to create an additional single-field match index if the values in the secondary field are dispersed more than the dispersion threshold. For example, and without limitation, this can include the database system creating a phone match index for the 97 Amazon records, and applying the phone match index to these records to create 97 phone match keys, including the phone match key 415-668, because the entropy of 1.99 for the 97 different values stored in the phone field by the 97 Amazon records is greater than the entropy threshold of 1.95. Although this example describes using a field's entropy to determine whether to use the field to create another single field match index, the database system may use other ways to determine whether to use a field to create another single field match index.

Having created the other match index based on the first field, a prospective record that stores the first value in the first field is optionally received, block 128. The system can receive new records that might be matched using the single field match index. By way of example and without limitations, this can include the database system receiving a new record that stores Amazon in the organization name field.

After receiving the prospective record, the other match index is optionally used to identify at least one record which stores the first value in the first field as matching the prospective record, block 130. The system can use any single field match index(es) to match new records with existing records. In embodiments, this can include the database system applying the organization name match index to a new record to generate the organization name match key Amazon and apply the phone match index to the new record to generate the phone match key 415-668 which are used to identify the database system's existing record which stores Amazon in the organization name field and 415-668-6000 in the phone field as matching the new record.

The method 100 may be repeated as desired. Although this disclosure describes the blocks 102-130 executing in a particular order, the blocks 102-130 may be executed in a different order. In other implementations, each of the blocks 102-130 may also be executed in combination with other blocks and/or some blocks may be divided into a different set of blocks.

In some situations, the database system's use of multiple match indexes may still identify a relatively large number of existing database records that shallow match acquired records. For example, the database system creates an organization name index and a city index from existing database records' values, and acquires a record that stores the misspelled value "San Francisco Bibicles" in the organization name field and stores the correctly spelled value "San Francisco" in the city field. The organization name attribute may be better than the city attribute for creating a match index for shallow matching with acquired records, but the database system cannot use the organization name index to identify any existing database records that shallow match the acquired record, due to the misspelled organization name in the acquired record. Therefore, the database system uses only the first two tokens "San" and "Francisco" in the acquired record's organization name field to reference an organization name index, and then determine the post-list size for the initial token sequence "San" and "Francisco." A post-list size of a value of an attribute can be a count of the records in a database or dataset having that value for that attribute. The database system determines that 1,000 existing database records are shallow matches for the acquired record because these 1,000 existing database records begin the organization name field with the two tokens "San" and "Francisco." However, 1,000 existing database records would be too many existing database records for an efficient use of the intensive multiple candidates matching process. Therefore, the database system identifies the value "San Francisco" that is stored in the city field of the acquired record, and then determines that 3,000 existing database records also store the value "San Francisco" in the city field. Since 3,000 existing records is 0.3 percent of the 1 million existing database records, the database system estimates that 3 existing database records would be shallow matches for the acquired record by multiplying 1,000 (existing database records that have the organization name field storing values which begin with "San" and "Francisco") by 0.3% (existing database records that have the city field storing the value "San Francisco").

While an estimated 3 existing database records would not be too many existing database records for the efficient use of the intensive multi-value matching process, the estimate of 3 existing database records was based on the presumed independence between the values in the organization name field and the values in the city field. However, if all existing database records which have organization name fields that store values which begin with "San" and "Francisco," also have city fields that store the value "San Francisco," the assumption of independence is incorrect.

Consequently, in this situation the multi-field query "organization name begins with San, Francisco AND city equals San Francisco" would identify the same 1,000 records that would be identified by the single field query "organization name begins with San, Francisco." Therefore, the database system may need to augment a match index with a measure of the dispersion of the match index's values relative to another match index's values to be able to accurately estimate the number of database records that would be identified as shallow matches when using multiple match indexes.

In accordance with embodiments described herein, there are provided systems and methods for optionally augmenting match indexes. A system can create a first trie based on values stored in a first field by multiple records; a second trie based on values stored in a second field by the multiple records, and a third trie based on values stored in a third field by the multiple records. The system can associate a node in the third trie with a record of the multiple records, based on a value stored in the third field by the record. The system can associate the node in the third trie with a first dispersion measure, based on values stored in the first field by records associated with the node, and with a second dispersion measure, based on values stored in the second field by the records associated with the node. The system can identify a branch sequence in the third trie as a match key for a prospective record, based on a prospective value stored in the third field by the prospective record. The system can use the match key to identify a subset of the multiple records, which match the prospective record. If a count of the subset exceeds a threshold, the system can identify a branch sequence in the first trie or the second trie as another match key for a prospective record, based on the first dispersion measure and the second dispersion measure. The system can use the match key and the other match key to identify a record, of the subset, that matches the prospective record.

For example, the database system creates a city trie based on values stored in the city field by multiple records, a phone number trie based on values stored in the phone number field by the multiple records, and an organization name trie based on values stored in the organization name field by the multiple records. The database system associates the node that follows the national, institute branch sequence in the organization name trie with the database record that stores the organization name National Institute of Health. The database system associates this node in the organization name trie with an entropy of 0.0 based on values stored in the city field by records associated with the node, and with an entropy of 1.0 based on values stored in the phone number field by the records associated with the node. The database system identifies the national, institute branch sequence in the organization name trie as a match key for the prospective record that stores the organization name National Institute of Hlth, the city New York, and the phone number 212-259-6000. The database system uses the national, institute match key to identify 200 database records that match the prospective record that stores the organization name National Institute of Hlth. Since the count of the 200 database records exceeds the threshold count of 100, the database system identifies the 212-259 branch sequence in the phone number trie as another match key for the prospective record, because the entropy of 1.0 for the phone number field's values is greater than the entropy of 0.0 for the city field's values. The database system estimates that the use of the national, institute match key for the organization name trie and the 212-259 match key for the phone number trie would identify 100 database records that store organization names which begin with National Institute and phone numbers which begin with 212-259 as matching the prospective record that stores the organization name National Institute of Hlth and the phone number 212-259-6000. Therefore, the database system uses the national, institute match key for the organization name trie and the 212-259 match key for the phone number trie to identify the database record that stores the organization name National Institute of Health and the phone number 212-259-6000 as matching the prospective record that stores the organization name National Institute of Hlth and the phone number 212-259-6000. Since the match key based on the organization name trie identified too many database records that matched the prospective record, the database system used the corresponding entropies to determine that a match key based on the phone number trie is better than a match key based on the city trie for narrowing the number of database records that match the prospective record.

The disclosed database system can create optimized match keys for fields having a prefix structure, and augment indexes used for matching records. A prefix structure can be a field value that includes a sequence of tokens, in which the sequencing order is important. Examples of such fields include zip code, telephone number, organization name, city, and street address. The database system can create an index for such a field and identify the match key values that cast as wide a net as possible, subject to performance constraints, which can result in some match key values being shorter than other match key values. For example, zip code-based match keys for higher-density areas of the USA may use all five digits, while zip code-based match keys for lower-density areas may use only the first three digits. Therefore, the zip code-based match keys that use only the first three digits will thus tolerate errors in the last two digits.

The database system can execute three phases, a build phase, an index-time use phase, and a lookup-time use phase. During the build phase, the database system can use tokenized values of a field in the database to build or create a trie data structure that is used by subsequent phases. A trie can be a tree of prefix sequences found in a record field, with every branch labeled by a token value. A root-to-node path yields a sequence of tokens, which is formed by concatenating the labels of all the branches in the path, starting from the root. The database system can store into each node the count of records in a database in which this field's value has that particular prefix sequence. When the database system receives a new field's value, the database system can reference the trie for the field to identify the path that is the value's unique prefix. If a prefix does not extend to the end of a full sequence, then the database system can extend the trie so that the value's unmatched suffix becomes a path below the current path. Next, the database system can increment the counts for all nodes in this path by 1. The database system does not need to fully build a trie, as the database system can freeze a node if the node's post-list size is less than a parameter s. The database system might not subsequently extend a frozen node.

The following table 1 depicts a simplified example of a database that the database system can use to create tries. Such a database in a production environment may include thousands of rows and hundreds of columns, which would be far too complex for depiction in table 1.

TABLE 1

| Organization name | City | Phone number | Zip code |
| --- | --- | --- | --- |
| National Institute of Health | New York | 212-259-6000 | 10014 |
| Amazon Web Services | San Jose | 408-259-2011 | 95116 |
| Starbucks Coffee | New Haven | 203-476-3700 | 06051 |
| National Cancer Center | New Haven | 203-752-1000 | 06536 |
| Starbucks Manufacturing | San Diego | 619-858-7110 | 91945 |

TABLE 1-continued

| Organization name | City | Phone number | Zip code |
| --- | --- | --- | --- |
| National Science Board | San Francisco | 415-668-6000 | 94158 |
| Amazon A9 | San Francisco | 415-353-4019 | 94114 |
| National Institute of Medicine | New York | 212-628-5000 | 11001 |

Figure 2A:
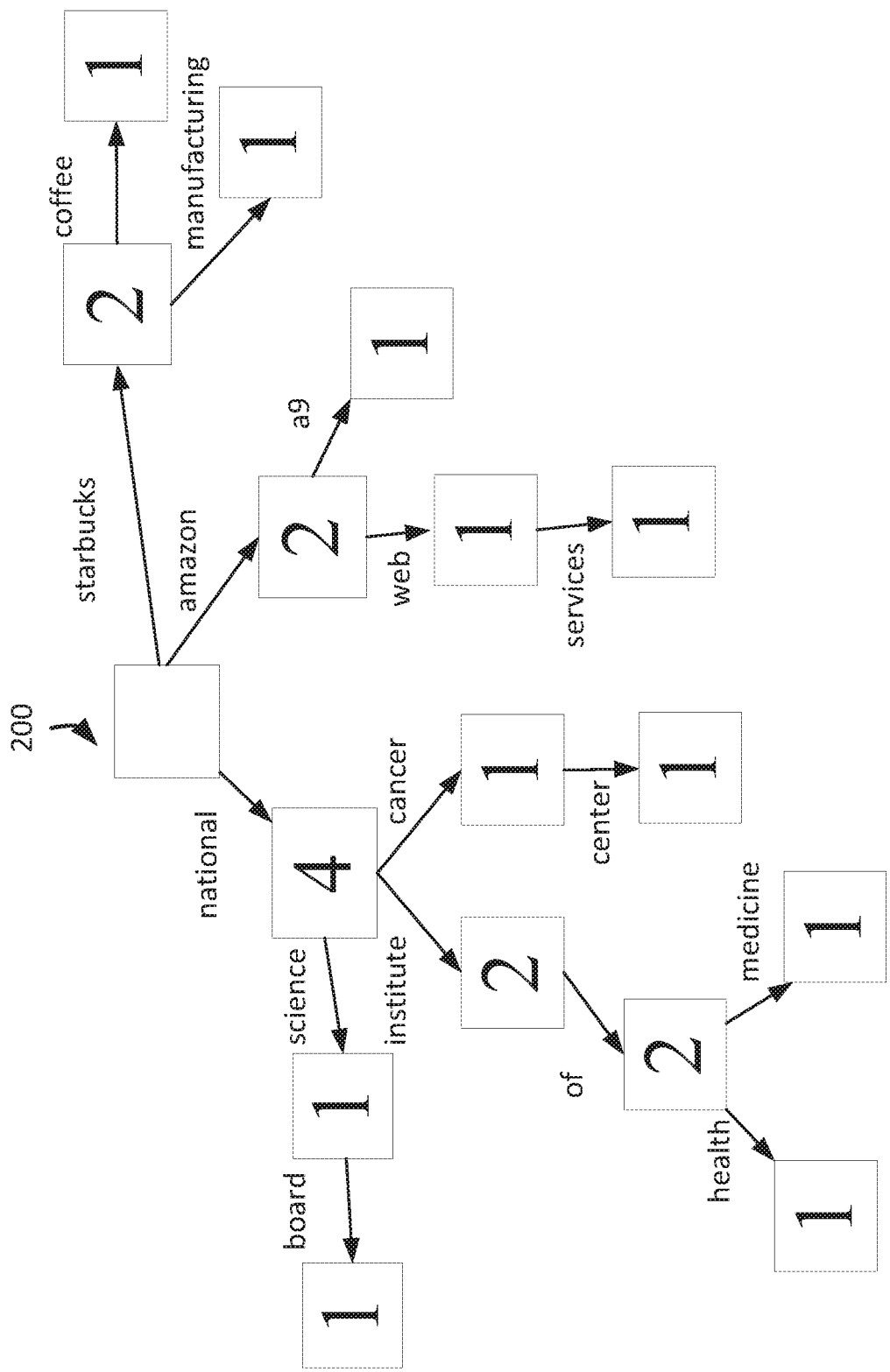
FIGS. 2A-C illustrate extremely simplified example tries used for augmenting match indexes, in an embodiment.
Figure 2:
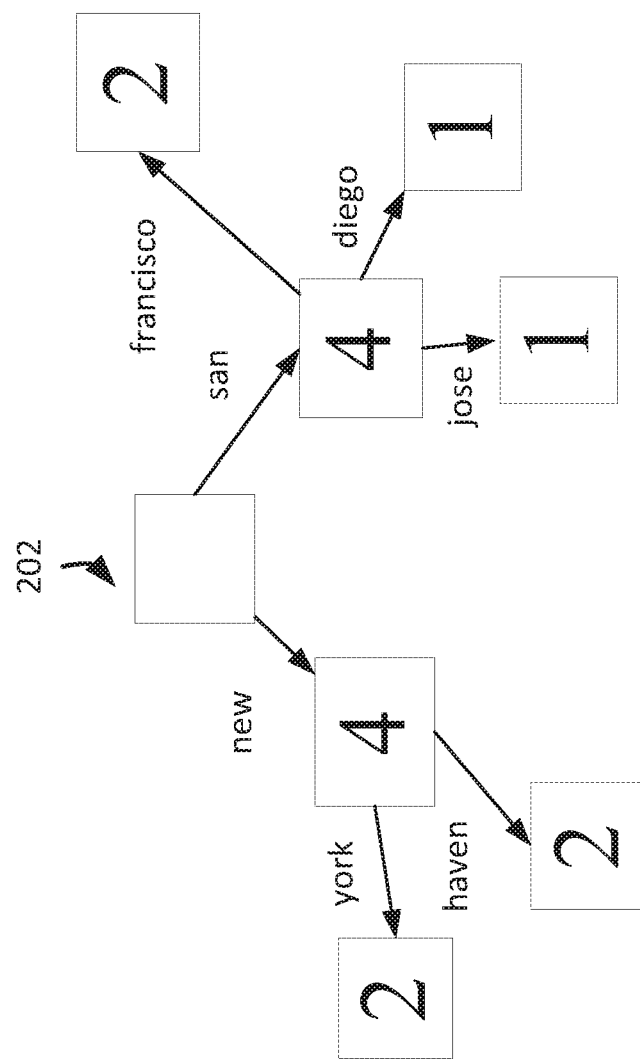
Figure 2:
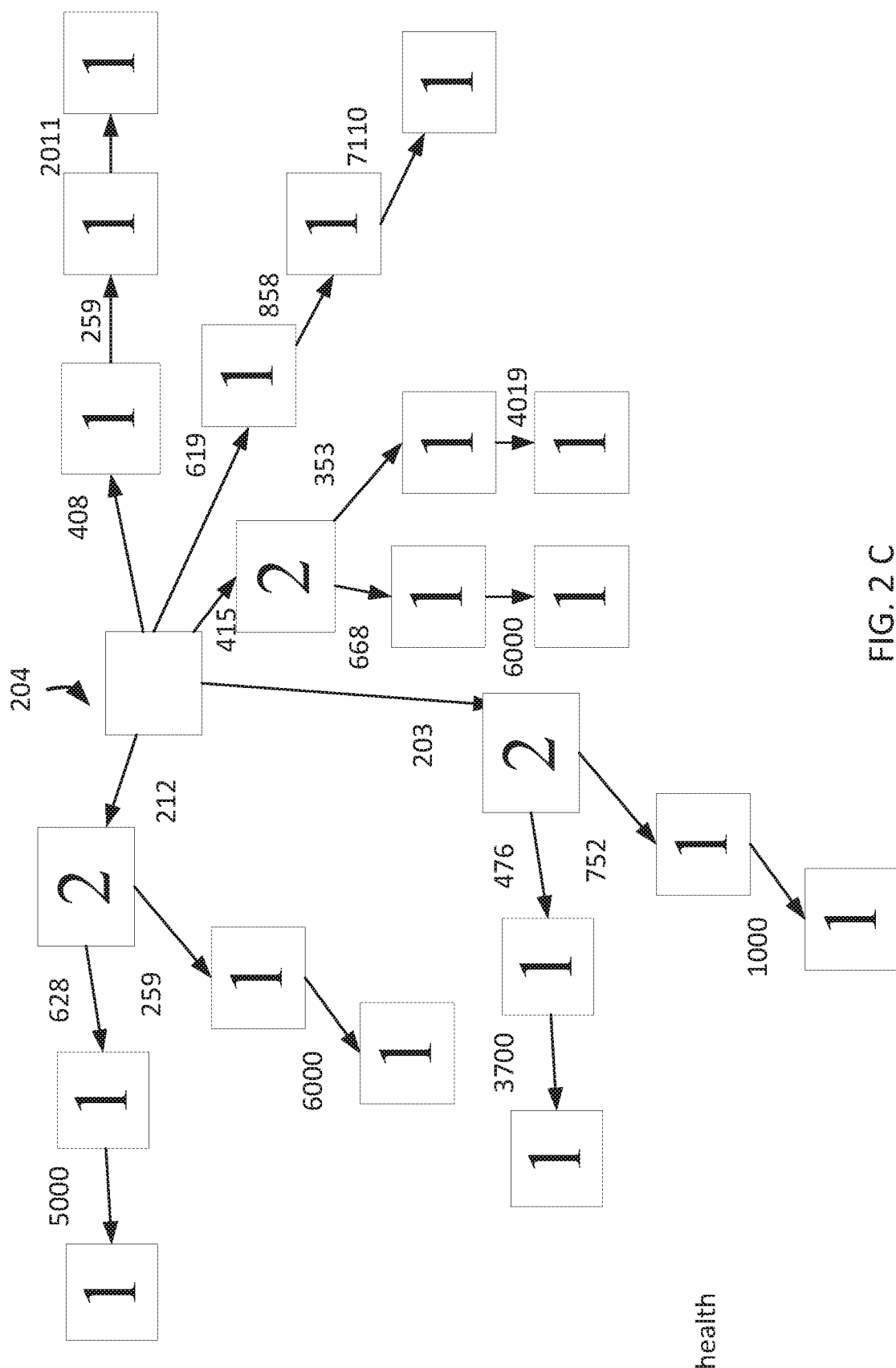

FIG. 2A depicts a simplified example of an organization name trie 200 that the database system can create based on the example organization name field values tokenized at the word level. The organization name National Institute of Health may be tokenized as <national, institute, of health>, the organization name National Cancer Center may be tokenized as <national, cancer, center>, the organization name National Science Board may be tokenized as <national, science, board>, and the organization name National Institute of Medicine may be tokenized as <national, institute, of medicine>. Similarly, the organization name Amazon A9 may be tokenized as <amazon, a9>, the organization name Amazon Web Services may be tokenized as <amazon, web, services>, the organization name Starbucks Coffee may be tokenized as <starbucks, coffee> and the organization name Starbucks Manufacturing may be tokenized as <starbucks, manufacturing>.

Likewise, FIG. 2B depicts a simplified example of a city trie 202 that the database system can create based on example city field values tokenized at the word level. Similarly, FIG. 2C depicts a simplified example of a telephone number trie 204 that the database system can create based on example telephone number field values tokenized at the digit group level. Each of the tries 200-204 is a simplified example of a trie because such a trie in a production environment can include thousands of nodes and branches, which would be far too complex for depiction in these figures.

The database system can identify a match key for the organization name National Institute of Health that is as short of a prefix as reasonably possible, which maximizes the ability to cope with errors and abbreviations in the organization name. First, the database system can consider the prefix national as a potential match key when examining the trie 200, which indicates that there are too many records whose organization name begins with national. When the database system considers national institute as a potential match key, the trie 200 indicates that there are a manageable number of records whose organization name begins with national institute. Therefore, the database system can use national institute as a match key for the organization name National Institute of Health.

If the database system receives a new record for matching with the database's records, and the new record includes the organization name National Institute of Hlth, the database system can go through the same procedure with the trie 200 and again identifies national institute as a match key for the new record. Therefore, records with either the full organization name or the abbreviated organization name will have the same value for the organization name index, allowing them to be grouped together for matching.

Zip/Postal code values are examples of fields with a prefix structure. Prefixes of zip codes correspond to broader geographic areas, at least for USA zip codes and Canadian postal codes. Telephone number values are also examples of fields with a prefix structure. Prefixes of telephone numbers generally correspond to broader instances, in geographic area or population. Organization names are examples of fields with a prefix structure because the least informative words, which may be referred to as stop words, tend to be the rightmost words in an organization name, such as Inc., Corp., and LLC., while the most informative words tend to be at the beginning of the organization name. For example, in the organization name Cisco Systems, Cisco is more informative than Systems. USA street addresses have a prefix structure because they have a sequential structure, with the most common pattern: <street number> <street name> <street suffix>.

The database system can exploit prefix structure not only because there is a simple and elegant way to capture post-list sizes of prefixes (which are used at index time to optimize the match keys) but also because fuzzy variations tend to be in the suffixes of fields with a prefix structure. For example, for zip codes and telephone numbers of matching records (such as contacts or accounts) the tail is more likely to differ than the head. This may be because people and companies tend to move in nearby locations, or a person gets assigned a new telephone number with the same three-digit area code and the same three-digit central office code, but with different four-digit station numbers. In the organization name field, stop words that are in the suffixes, such as Inc., Corp., and LLC., are more likely to be left off than the first word in the organization name. In USA street addresses, the content in the tail, such as suite number or floor number, is more likely to be left off than the content in the head of the street address.

The database system can use a normalizer to detect and strip away blanks in a field value, which often occur in Canadian and British postal codes. The database system can also use a normalizer to detect and strip away international codes, and non-digit characters from telephone numbers. The database system may tokenize zip codes and telephone numbers at the level of individual characters and tokenize an organization name and street addresses at the level of words, or at the level of syllables.

A USA telephone number is in the format XXX-YYY-ZZZZ, where XXX is the area code, YYY is the central office code, and ZZZZ is the station number. It is not uncommon for people entering information for records to leave off the area code. To accommodate this, the database system can generate a second value from the normalized value of a USA telephone, in which the second value has the area code removed. Both values may be used when the database system builds the corresponding tries.

After the database system builds a trie during the build phase, the database system can use the trie at index time as follows. Suppose the database system is indexing record r on a particular field having a prefix structure for which its trie has been built. First, the database system can normalize this field's value in r and tokenize it the same way as in the build phase. Next, if the database system needs to derive additional token value sequences from this, the database system can do so, such as generating a value without the area code for USA telephone phone numbers. For each token value sequence (in most cases there is only one), the database system can reference the corresponding trie to identify the shortest prefix p with a sufficiently small post-list size. The database system can add the record r to the prefix p's post-list. The database system can also mark the node in the trie at which the prefix p ends with a tag indicating that this prefix was indexed. The database system can use this tag at lookup time.

By using the prefix p as the match key, the database system can identify any record whose field value starts with this prefix. However, if there are fuzzy variations (such as spelling errors) inside of the prefix p itself, the database system may not identify a matching record. Therefore, the database system can focus on the following four operators to improve recall for such fuzzy variations: a transposition operator, which randomly exchanges adjacent tokens, a blurred-substitution operator, which replaces a random token by a place-holder, an insertion operator, which inserts a place-holder token at a random position, and a deletion operator, which deletes a token at random position. After applying any of these operators to the prefix p, the database system can generate a new match key. The database system may have a parameter b that specifies a budget—the maximum number of such operations allowed—when indexing a field with a prefix structure. Let n denote the number of records in the database to be indexed. The database system can allocate a budget of operations to the prefix p, allocating b/4n to each of the four operation types. The database system can create up to b/4n copies of the prefix p by transposing tokens at positions i and i+1, where i is selected randomly without replacement to be a position in the prefix p. The database system can create up to b/4n copies of the prefix p by blurring the token at the position i, where i is selected randomly without replacement to be a position in the prefix p. The database system can create up to b/4n copies of the prefix p by inserting a place-holder token after the token at the position i, where i is selected randomly without replacement to be a position in the prefix p. The database system can create up to b/4n copies of the prefix p by deleting a token at the position i, where i is selected randomly without replacement to be a position in the prefix p. If the database system creates less than b/n new match keys for a prefix p, the database system may add the residual value towards the budget of the next field or the next record.

At look-up time, the database system can follow the same process as at index time. Specifically, first the database system can normalize the field value, tokenize the field value, identify the shortest prefix p in the corresponding trie whose post-list size is sufficiently small, and generate fuzzy variants of the prefix p as done in the indexing phase.

For example, the database system accesses records in a large database of organization-at-location records, such as the database provided by Dun & Bradstreet, creates a trie for the organization name field, references the organization name trie to identify organization name match keys for the records, creates a trie for the city field, and references the city trie to identify city match keys for the records. When the database system attempts to determine whether a suspect record having non-null values for organization name and city matches any of the database records, the database system may need to determine which of the two indexes—organization name prefix or city prefix-should be used in the look up phase. The post-list sizes of each of the match keys in the suspect record may be unacceptably large, such as when the organization name is Starbucks and the city is New York City, as there are a large number of Starbucks locations and a large number of organizations are located in New York City. In this case, the database system may use the lookup organization-name-prefix=starbucks AND city-name-prefix=new york.

The post-list sizes of one the match keys in the suspect record may be small enough, such as when the city is Topeka, as a small number of organizations are located in Topeka, and the organization name is Starbucks. In this case, the database system may use the lookup city-name-prefix=topeka, intentionally omitting the use of the organization-name-prefix to favor recall, as the organization name in the suspect record may include a spelling error—such as sturbucks.

The post-list sizes of each of the match keys in the suspect record may be small enough, such as when the city is Topeka and the organization name is Frito-Lay. In this case, the database system may use the lookup organization-name-prefix=frito-lay OR city-name-prefix=topeka, which favors recall even more.

These examples imply that the database system should setup indexes in such a way that at lookup time the database system can specify certain Boolean queries, such as ANDs and ORs, over various match keys. The database system can store the indexes in an enterprise search platform, such as SOLR, which enables the database system to leverage built-in mechanisms for specifying any Boolean query over the indexes.

Given a suspect record, the database system may need to generate an efficient indexes query. Suppose the indexed match keys in the suspect record are $x_1, x_2, \ldots x_k$, where $x_i$ is the match key for the attribute i. The tags in the tries are used to find where the match keys end. Attributes are identified by position for notational convenience. First, the database system can sort the match keys by their post-list sizes in non-decreasing order. The post-list sizes are the counts in the nodes in the tries that correspond to the match keys. Let the index sequence in the sorted order be $\pi_1, \pi_2, \ldots \pi_k$, a certain permutation of $1, 2, \ldots k$, and the corresponding post-list sizes be $s_{\pi 1}, s_{\pi 2}, \ldots s_{\pi k}$. Let M denote the maximum candidate list size that is deemed acceptable. Either there exists the longest sequence of prefixes $\pi_1, \pi_2, \ldots \pi_j$ of $\pi_1, \pi_2, \ldots \pi_k$ so that the sum of the post-list sizes in this prefix sequence does not exceed M, or such a prefix sequence does not exist. If such a prefix sequence exists, the database system can formulate the OR query, $x_{\pi 1}$ OR $x_{\pi 2}$ OR $\ldots$ OR $x_{\pi j}$.

If such a prefix sequence does not exist, the database system can define $P_{\pi i} = s_{\pi i}/n_{\pi i}$, $i=1, \ldots k$, where $n_{\pi i}$ is the post-list size at the root of the trie of the attribute $\pi_i$. More simply, $n_{\pi i} = n$, where n is the number of records in the database that is indexed, which may be the number of documents in the SOLR index. Next, the database system can identify the shortest sequence of prefixes $\pi_1, \pi_2, \ldots \pi_j$ of $\pi_1, \pi_2, \ldots \pi_k$, satisfying $$s_{\pi 1} * P_{\pi 2} \ldots * P_{\pi j} \leq M$$

which estimates the candidate list sizes of intersections of match keys under the assumption of independence of attributes. This assumption can sometimes be completely wrong.

For example, relevant data for matching suspect records is in the table below. Each cell has a value x/y where x is the attribute value and y the post-list size of the match key with this same attribute value.

| Organization Name | City | Phone |
|---|---|---|
| Starbucks/20k | New York City/5k | 212/25k |
| Frito-Lay/50 | Topeka/50 | 785/600 |

Suppose M=500 and the database has 1,000,000 records. For the first suspect record, the database system can generate the lookup query organization-name-prefix=starbucks AND city-name-prefix=new york, based on the estimated candidate list size of 100, derived from the equation 20,000 multiplied by 5,000 divided by 1,000,000 equals 100, which is less than the M of 500.

The independence assumption may be relaxed. For example, the attributes organization name and website are often correlated, such as when the website of all organization-at-location instances in the database in which the organization name is Starbucks will likely be starbucks.com. Therefore, the database system performing an AND operation using the match keys of the organization-name-prefix and the website prefix will likely not reduce the candidate list size by much, if at all. Consequently, the database system can try to find a set of attributes that are as pairwise uncorrelated as possible, and/or can estimate the candidate set size more accurately when correlations are present. The input is the order of $\pi_1, \pi_2, \ldots \pi_k$, such that the match keys are in order of non-decreasing post-list size.

$L \leftarrow \pi_1$
$s \leftarrow S_{\pi 1}$
while $|L| < k$
  Find $\pi_{j\ not\ in}\ L$ which minimizes $(1/|L|)*\Sigma_{j\ in\ L} m_{\pi j 1}$, where $m_{\pi j 1}$ is the mutual information [1] between attributes $\pi_j$ and l
  Add $\pi_j$ to L
  $s \leftarrow s*f(P_{\pi j}, m_{jL})$
  Break if $s < m$
Endwhile When two attributes are (fully) independent, their mutual information is 0. In this case, f(P, m) needs to equal P. As dependence increases, mutual information starts increasing. So as m increases, f(P, m) needs to go to 1. The following function approximately produces this behavior.

$$f(P,m) = \tanh((1+m)*P)$$

When P is small, $f(P, 0) = \tanh(P) \approx P$. As m increases, $\tanh((1+m)*P)$ approaches 1. From these constraints, the form and parameters of f(P, m) are derived. First, assume that the maximum value of the average mutual information $(1/|L|)*\Sigma m_{\pi j 1}$ is known, and denote it a.

$f(P, 0)$ needs to $=P$ and $f(P, a) \to 1$. The following function approximately achieves this.

$$f(P,m) = (2/(1+e^{-\mu(m)*P})-1) \text{ where } \mu = 1/a*\ln(1-2/1.99)$$

The form of f(P, m) is a hyperbolic tangent, which is just $2\sigma-1$, where $\sigma$ is the usual sigmoid. The slope $\mu(m)$ of this function needs to depend on m, being small when m is small and large when m is large. In more detail, f(P. m) equals P when m is 0 and has a sigmoidal curve passing through f(0, m)=0 and f(0, a)=0.99.

The database system can start with the attribute whose match key has the smallest post-list size, and then try to find an attribute among the rest of the attributes that is maximally independent of this attribute. The database system can compute the new estimated result set size s after adding this attribute and repeat the process. The mutual information of any two attributes may be estimated offline from the database in advance. The resulting matrix (of mutual information of pairs of attributes) will be relatively small if there are relatively few attributes.

One use case is multi-tenant deduplicating, which involves de-duplicating objects—especially contacts, leads, and accounts—within each tenant or organization. For this purpose, the database system can build tenant or organization-specific indexes to group together candidate duplicates in the organization's objects. Typical indexing algorithms used presently in production are parametrized, but these parameters are not exploited to use different settings for different organizations when appropriate. The disclosed database system can automatically tune the organization-specific indexes to the organization's data, and moreover at a much more granular level than even possible with the approaches presently in production. Organization sizes, characterized by the number of account, contact, lead, and other objects in the organization, can vary greatly. There may be a large number of extremely small organizations having fewer than 1,000 records of each type. At the other extreme, there may be a small number of extremely large organizations, each having more than 10 million records of each type. The disclosed database system can maximize the duplicate detection rate while remaining with performance limits. Initially, for clarity of exposition, assume that each organization has the same amount of computing resources available (such as central processing units, memory, and disk usage) for deduplicating, regardless of its size. In this case, the disclosed database system can automatically use very coarse match keys for extremely small organizations, and fine match keys for extremely large organizations. This is because for extremely small organizations, even very coarse match keys will remain performant. For extremely large organizations, very coarse match keys will likely not remain performant, so the disclosed database system can use finer match keys, which risks failing to detect some duplicates. This problem can of course be mitigated by providing very large organizations with much more computing resources than smaller organizations.

Another use case is for matching customer relationship management (CRM) records with data marketplace data, which is the result of data vendors offering their data sets for purchase by organizations. Such data sets tend to be specialized for particular verticals or for particular types of cross-vertical data. For an organization that purchases such a data set, the database system can use matching to append the vendor's specialized data to appropriate objects stored by the organization. For example, an organization sells products and/or services to hospitals and purchases a hospital-specific data set from a vendor in the data marketplace, which contains niche attributes such as hospital beds. Via matching the accounts in the organization that are hospitals may automatically get matched to the correct hospital in this data set, and from this match important attributes in the vendor's data (such as the number of beds) may get appended to the CRM record where possible. A data marketplace will contain data of all sorts. In many cases, unknown attributes will be present. Ideally, the database system can index a new data set without any human involvement. Following an initial human configuration—which fields on a new data set to put prefix indexes on—the database system can take over, automatically creating optimal individual indexes—indexes that maximize recall while remaining performant for look-ups, and automatically generating an efficient multi-index query for a suspect record dynamically, again maximizing recall while remaining performant.

If the database stores data about information technology companies, the zip codes for Silicon Valley will likely be associated with a larger numbers of information technology companies than the zip codes for Topeka, Kans. Therefore, the database system may use finer zip code match keys, such as 5 digits, for the Silicon Valley information technology companies than for the Topeka information technology companies, for which the database system may use coarser zip code match keys, such as the first 3 digits. Continuing this example, the database system uses the match key 666 for the Topeka zip code 66604. While the database system cannot generate any fuzzy variation of a match key for this zip code by transposition, the database system can generate substitution expansions, such as 66c04 and c6604. Therefore, in this example the 666 prefix will cover all variations in the last two digits while keeping the post-list size manageable, and the substitution expansions will cover errors in the first or third digit.

The database system can normalize the telephone number 515-123-4567 as the normalized number 5151234567, use the normalized number to build a trie of telephone numbers, strip the area code to create the stripped number 1234567, and add the stripped number to the trie of telephone numbers. At index time, the database system can reference the corresponding tries to identify the shortest acceptable prefix for the normalized number, such as 515123, and the stripped number, such as 123456. Next, the database system can generate new fuzzy variations from each of these prefixes by applying the transposition, blurred substitution, insertion, and deletion operators as previously described. For example, the database system generates the additional match keys 155123, 551123, 515213, 515c23, 5c5123, 51123, 51512c3 for the prefix 515123.

The trie augmentation algorithm below takes any two dataset fields i and j as an unordered pair and augments the tries $T_i$ and $T_j$ using the projection of this data set onto these two fields. In view of this, to simplify the explanation, assume that the data set has only two fields. Let $D=\{(x_1, x_2)\}$ denote a data set—a set of ordered pairs, on two fields 1 and 2, and suppose that the database system has already built tries from the values of the two fields in D. Let a k-prefix denote the sequence of the first k tokens in a tokenized value. For example, the 2-prefixes of organization names in a data set are all the two-token sequences that appear as the first two tokens in organization names. At each node $T_i(u)$. i=1, 2 and for each k=1, . . . , the database system stores a measure of the dispersion of k-prefixes of field j that co-occur with the value at this node in D. The trie augmentation algorithm takes one pass over the data set to accumulate values and frequencies of co-occurring prefixes of field j at node u of the trie. This first pass results in, at node $T_i(u)$, for each k, an empirical distribution of the frequencies of various k-prefixes of values of field j that co-occur with the value at node u. At the end of the first pass, the trie augmentation algorithm has the empirical distributions at all nodes in each trie. Then, the trie augmentation algorithm visits every node in each trie, computes a suitable measure of dispersion of each empirical distribution at that node, and replaces each of these distributions by the value of this dispersion measure. Formally, let $T_i(u, j, k)$ denote the empirical distribution of k-prefixes of values of field j that co-occur with the value (of field i) at node u. The measure of dispersion is the so-called entropy:

$$H_i(u,j,k) = -\Sigma_v p_v \log_2 p_v,$$

where v is a k-prefix of field j, and $p_v$ its empirical probability in $T_i(u, j, k)$. Although this example of a dispersion measure is based on entropy using a logarithm base 2, the entropy may be based on any logarithm base, or any other type of dispersion measure.

The lookup algorithm takes a threshold m and generates, when possible, the widest lookup query whose estimated result size does not exceed m. For every field i=1, . . . k that is populated in the suspect record and is indexed, the longest prefix $p_i$ of its value in the suspect record that also appears in this field's trie $T_i$ is generated. Let $n_i(p_i)$ denote the count on node $p_i$ of this prefix in trie $T_i$. Next, the fields i are sorted in non-decreasing order of their prefix counts. That is, in the new order, the database system has $n_1(p_1) \leq n_2(p_2) \leq n_3(p_3) \leq n_i(p_i)$. If there is a j such that $\Sigma^j_{i=1} n_i(p_i) \leq m$, then the lookup is the OR query $1=p_1$ OR $2=p_2$ OR . . . $j=p_j$. In this notation, $i=p_i$ denotes searching the index on field i with the match key $p_i$. This is the heuristic choice of the widest query estimated to yield no more than m results. If no such j exists, the lookup algorithm first initializes the query to the term $1=p_1$. Next, at node $p_1$ in trie $T_i$, the lookup algorithm attempts to identify an augmentation (if one exists) in which, for some field $j\in(2, 3, \ldots k)$, and for some l-prefix of field j's value in the suspect record, the entropy $H_1(p_1, j, l)$ is large enough so that $n_1(p_1)*1/2^{H_1(p_1, j, l)} \leq m$. If the lookup algorithm identifies such an augmentation, then the new query is $1=p_1$ AND $j=p_j(l)$, where $p_j(l)$ denotes the l-prefix of the value of field j in the suspect record and the lookup algorithm is done. If no such j exists, the lookup algorithm identifies the pair (j, l) that maximizes $H_i(p_i, j, l)$, and constructs the new query $1=p_1$ AND $j=p_j(l)$. Next the lookup algorithm attempts to identify $j'\in(2, 3, \ldots k)-j$ and an l' that maximizes the mean $\mu$ of $H_1(p_1, j', l')$ and $H_j(p_j(l), j', l')$. The new query is $1=p_1$ AND $j=p_j(l)$ AND $j'=p_{j'}(l')$, and its estimated number of results is $n_1(p_1)*(1/2^{H_1(p_1, j, l)})*(1/2^\mu)$. Note that the use of $\mu$ is a heuristic choice motivated by intuition— if both $H_1(p_1, j', l')$ and $H_j(p_j(l), j', l')$ are large, then $j'=p_j(l')$ is uncorrelated with both $1=p_1$ and $j=p_j(l)$.

In an example, the existing database records include a first-name field, a last-name field, and an organization-name field. The database system can index each of these fields and create a corresponding trie for each field. All tries in this example are based on word-level tokenization. A suspect record stores the value "John" in the first-name field, the value "Smith" in the last-name field, and the value "Salesforce" in the organization-name field. Every one-token lookup, which is based on first-name starts with John, last-name starts with Smith, or organization-name starts with Salesforce, will return too many results. There are too many John's, too many Smith's, and too many business contacts in the Salesforce organization. In this example, since organization-name starts with Salesforce has the smallest post-list size, the database system uses "organization-name starts with Salesforce" as the initial query. Since this query will return too many records for the intensive multi-value matching process, the database system looks up the node [salesforce] in the organization name trie to determine if there are any other fields whose entropies for prefixes of a certain order are high. In this case, the database system discovers that both first-name (first-word) and last-name (first-word) have high entropies at the node [salesforce]. In other words, in salesforce, there are people with many different first words in first names, and there are also people with many different first words in last names. For this example, the first-name (first-word) entropy is higher. Therefore, the database system constructs a new query, "organization-name starts with salesforce AND first-name starts with john." However, the database system determines that this query still returns too many results because there are too many people named John who work at Salesforce. In this example, the database system has only one remaining attribute: last-name. The database system determines that the entropies of last-name (first word) on node [salesforce] in the organization-name trie and on node [john] in the first-name trie are both large. This suggests that the distribution of the first words in the last names of the various John's at Salesforce is quite disperse. This in turn suggests that the query "organization-name starts with salesforce AND first-name starts with john AND last-name starts with smith" will reduce the result set size drastically further. Therefore, this is the query that the database system uses.

In another example, another suspect record stores the value "John" in the first-name field, the value "Rockinsksy" in the last-name field, and the value "Salesforce" in the organization-name field. In this example, since the "last-name starts with Rockinksy" has the smallest post-list size, the database system starts with the query, "last-name starts with Rockinsky." The database system determines that this query will return a relatively small number of results because there Rockinsksy is a very rare last name. If the query will return a relatively large number of results, the entropy of first name's first word given last-name starts with Rockinsky should be high enough that the query "first-name starts with John AND last-name starts with Rockinsky" has a sufficiently small post-list size.

Figure 3:
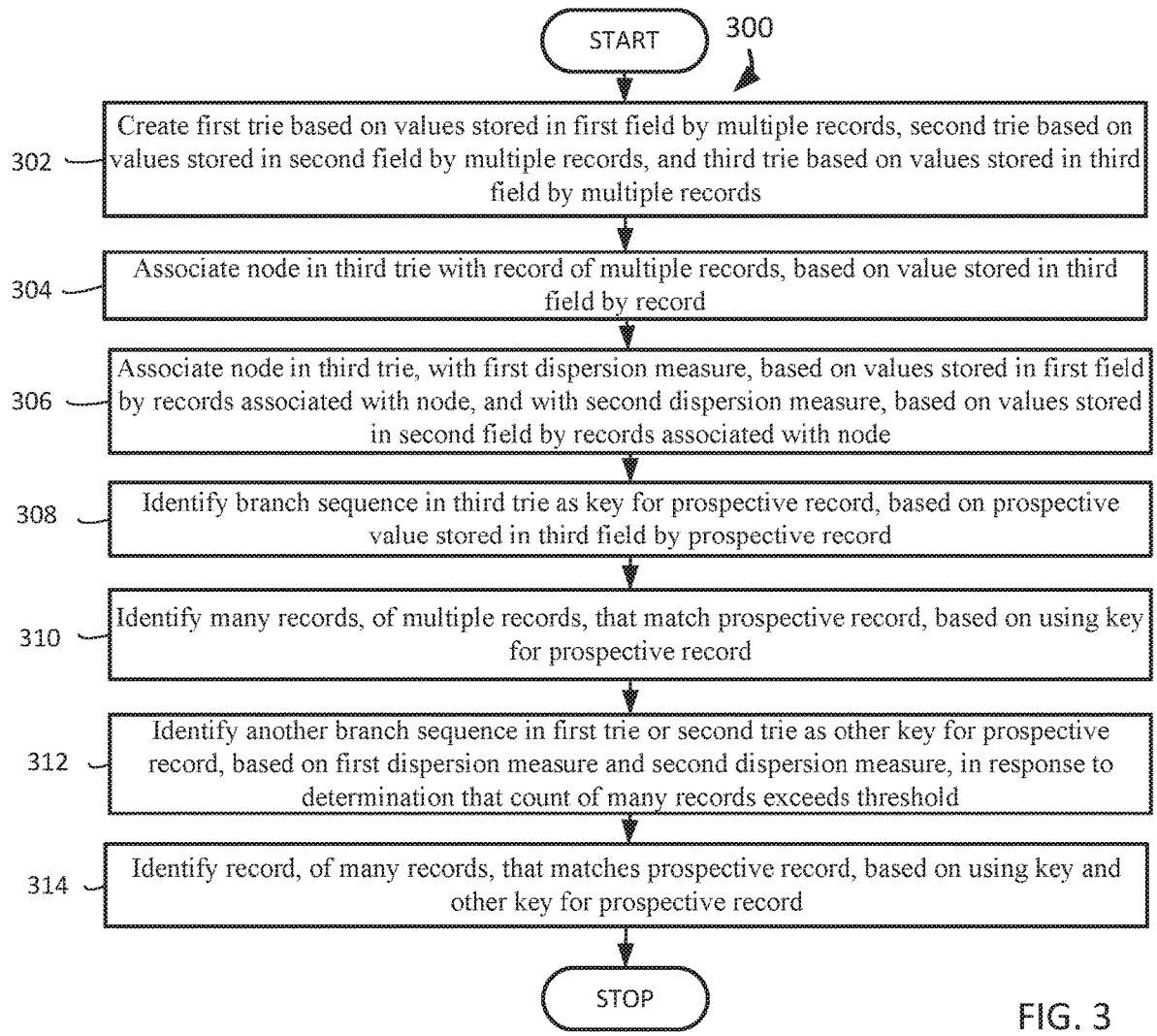
FIG. 3 is an operational flow diagram illustrating a high-level overview of a method for augmenting match indexes, in an embodiment.

FIG. 3 is an operational flow diagram illustrating a high-level overview of a method 300 for augmenting match indexes. A first trie is optionally created based on values stored in a first field by multiple records, a second trie is optionally created based on values stored in a second field by the multiple records, and a third trie is optionally created based on values stored in a third field by the multiple records, block 302. The system can create tries that will be augmented to match records. For example, and without limitation, this can include the database system creating the city trie 202 based on values stored in the city field by multiple records, the phone number trie 204 based on values stored in the phone number field by the multiple records, and the organization name trie 200 based on values stored in the organization name field by the multiple records, as depicted by FIGS. 2A-C. The database system can determine which tries to create to match records, which subsequently affects which tries are selected to match records. A detailed description of examples of determining which tries to create for record matching is discussed in commonly owned U.S. Patent Application No. 2018/0165281, entitled MATCH INDEX CREATION, by Arun Kumar Jagota, et al., filed Jun. 14, 2018. which is incorporated herein by reference. A trie can be a tree-like ordered data structure that is used to store a dynamic set or associative array of values, where the search keys are usually strings. A value can be the symbols on which operations are performed by a computer, being stored and transmitted in the form of electrical signals and recorded on magnetic, optical, or mechanical recording media. A record can be the storage of at least one value in a persistent form. A field can be a part of a record, representing an item of data.

Creating the third trie may include tokenizing the values stored in the third field by the multiple records, and creating the third trie from the tokenized values, each branch in the third trie labeled with one of the tokenized values, each node storing a count indicating a number of the multiple records associated with a tokenized value sequence beginning from a root of the third trie. For an example of creating the organization name trie 200, the database system begins by tokenizing National Institute of Health as <national, institute, of, health>, National Cancer Center as <national, cancer, center>, National Science Board as <national, science, board>, National Institute of Medicine as <national, institute, of medicine>, Amazon Web Services as <amazon, web, services>, Amazon A9 as <amazon, a9>, Starbucks Coffee as <starbucks, coffee>, and Starbucks Manufacturing as <starbucks, manufacturing>. Tokenizing can be the process of dividing a stream of text up into words, phrases, symbols, or other meaningful elements, which may be referred to as tokens. Tokenized values can be symbols or text divided into words, phrases, symbols, or other meaningful elements. A branch can be a subdivision or a lateral extension extending from the main part of a tree or a trie. A node can be a connecting point at which lines or pathways in a tree or trie intersect or branch. A root can be the originating point of a tree or trie. A number and/or a count can be an arithmetical value, expressed by a word, symbol, or figure, representing a particular quantity and used in making calculations and for showing order in a series or for identification. A tokenized value sequence can be a particular order in which divided words, phrases, symbols, or elements follow each other.

Completing the example of creating the organization name trie, the database system can create the organization name trie 200 that includes a branch labelled national from the trie root to a first sequential node; branches labelled institute, cancer, science from the first sequential node to the second sequential nodes; branches labelled of, center, and board from the second sequential nodes to the third sequential nodes, and branches labelled health and medicine from a third sequential node to fourth sequential nodes, as depicted in FIG. 2A. The first sequential node stores the count 4 for the 4 organization names that begin with national, the second sequential nodes store the count 2 for the 2 corresponding organization names that begin with national institute, and store the count 1 for the 1 corresponding organization name that begins with national cancer, or national science, the third sequential nodes store the count 2 for the 2 corresponding organization names that begin with national institute of, and store the count 1 for the 1 corresponding organization name that begins with national cancer center, or national science board, and the fourth sequential nodes each store the count 1 for the 1 corresponding organization name that begins with national institute of health or national institute of medicine.

The organization name trie 200 in FIG. 2A also includes a branch labelled amazon from the trie root to a first sequential node; branches labelled web, a9 from the first sequential node to the second sequential nodes; and a branch labelled services from a second sequential node to a third sequential node. The first sequential node stores the count 2 for the 2 organization names that include amazon, the second sequential nodes each store the count 1 for the 1 corresponding organization name that includes web or a9, and the third sequential node stores the count 1 for the 1 organization name that includes services.

The organization name trie 200 in FIG. 2A additionally includes a branch labelled starbucks from the trie root to a first sequential node, and branches labelled coffee and manufacturing from the first sequential node to the second sequential nodes. The first sequential node stores the count 2 for the 2 organization names that include starbucks, and the second sequential nodes each store the count 1 for the 1 corresponding organization name that includes coffee or manufacturing.

After the tries are built, a node in the third trie is optionally associated with a record of the multiple records, based on a value stored in the third field by the record, block 304. The system can store records with nodes that will be identified to match other records. By way of example and without limitation, this can include the database system associating the node that follows the national, institute branch sequence in the organization name trie 200 with the database record that stores the organization name The National Institute of Health.

Associating the node in the third trie with the record may include tokenizing the value stored in the third field by the record, identifying each node, beginning from a root of the third trie, corresponding to a token value sequence associated with the tokenized value, until a node is identified that stores a count less than a node threshold, identifying a branch sequence comprising each identified node as a match key for the record, and associating the match key with the node, and the record with the match key.

For an example of associating an organization name trie node with a record, the database system tokenizes the organization name National Institute of Health as <national, institute, of health> for a database record during the indexing phase. Continuing the example of associating an organization name trie node with a record, the database system can use the tokenized values national, institute, of health to identify that a first sequential node stores the count 4 for the token value sequence national, and stop after identifying that a second sequential node stores the count 2 for the token value sequence national, institute, because this second sequential node's count 2 is less than the token threshold count of 2.5. A node threshold can be the magnitude or intensity that must be met or exceeded for a certain reaction, phenomenon, result, or condition to occur or be manifested.

Further to the example of associating an organization name trie node with a record, the database system can identify the branch sequence national, institute as the match key for the database record that stores the organization name National Institute of Health. A branch sequence can be a particular order in which subdivisions or lateral extensions extending from the main part of a tree or a trie follow each other. A key or a match key can be a prefix of a field in a record that is used to lookup the record.

When the database system identifies the branch sequence that includes each identified node as the match key for the record, the database system may also create a transposed match key for the record by exchanging adjacent tokens in the match key, create a substitution based match key for the record by substituting a placeholder for a token in the match key for the record, create an insertion based match key for the record by inserting a placeholder in the match key for the record, and/or create a deletion based match key for the record by deleting a token in the match key for the record. For example, when the database system identifies 515123 as the match key for the database record that stores the telephone number 515-123-4567, the database system also creates the transposed match key 551123, the substitution based match key 595123, the insertion based match key 5015123, and the deletion based match key 51523 for the database record that stores the telephone number 515-123-4567. Creating fuzzy variations of match keys for database records and for prospective records enables the database system to match these records even when the database records and/or the prospective records include errors. Although this example illustrates the database system creating one of each type of fuzzy variation match key for the match key, the database system may create any number of each type of fuzzy variation match key for the match key. For example, if the database system has a fuzzy variation budget of 12,000,000 and stores 1,000,000 records, then the database system creates a total of 12 fuzzy variations (12,000,000 divided by 1,000,000) for each match key, such as creating 3 transposed match keys, 3 substitution based match keys, 3 insertion based match keys, and 3 deletion based match keys for each match key.

Completing the example of associating an organization name trie node with a record, the database system can tag the node after the institute branch with the match key national institute, and add the database record that stores the organization name National Institute of Health to a list of records for the match key national institute, and to the lists of records for any corresponding fuzzy variation match keys.

Once records are associated with nodes in the tries, the node in the third trie is optionally associated with a first dispersion measure, based on values stored in the first field by records associated with the node, and optionally associated with a second dispersion measure, based on values stored in the second field by the records associated with the node, block 306. The system can augment tries with dispersion measures that may be used to select the best tries for matching a record. In embodiments, this can include the database system associating the node in the organization name trie 200 with an entropy of 0.0 based on values stored in the city field by records associated with the node in the organization name trie 200, and with an entropy of 1.0 based on values stored in the phone number field by the records associated with the node in the organization name trie 200. For this example, the example values depicted in table 1 above indicate that the second sequential node which follows the branch sequence national, institute, in the organization name trie 200 is associated with 2 records that correspond to the second sequential node in the city trie 202, which is associated with the same 2 records that store only 1 value, new, york, in the city field, and correspond to the second sequential node in the phone number trie 204, which is associated with the same 2 records that store only 2 values, 212-259, 212-628, in the phone number field.

In the so-called entropy equation, $H_i(u, j, k) = -\Sigma_v p_v \log_2 p_v$, which is described above, v is a k-prefix of field j, and $p_v$ its empirical probability in $T_i(u, j, k)$. For the city field in this example, $p_{new, york}=1$ for the only 1 value of v, which results in an entropy calculation of 0.0. For the phone number field in this example, $p_{212-259}=\frac{1}{2}$ for one value of v, and $p_{212-259}=\frac{1}{2}$ for the other value of v, which results in an entropy calculation of 1.0. Since this example describes two records that store one value in one phone number field and another value in another phone number field, the entropy calculation is based on a uniform distribution of values. In an example entropy calculation based on a non-uniform distribution of values, the second sequential node which follows the branch sequence national, institute, in the organization name trie 200 is associated with 200 records that correspond to the second sequential node in the phone number trie 204, which is associated with the same 200 records. with 150 of these records storing the value 212-259 in the phone number field and 50 of these records storing the value 212-628 in the phone number field. For the phone number field in this non-uniform distribution example, $p_{212-259}=150/200$ for one value of v, and $p_{212-259}=50/200$ for the other value of v, which results in an entropy calculation of 0.7.

The values stored in the first field by records associated with the node in the third trie may be associated with a node in the first trie, the node in the first trie may be at a same node depth as the node in the third trie, and the values stored in the second field by the records associated with the node in the third trie may be associated with a node in the second trie, the node in the second trie may be at the same node depth as the node in the third trie. For example, the second sequential node which follows the branch sequence national, institute, in the organization name trie 200 corresponds to the second sequential node in the city trie 202, which is associated with the 2 records that store only the value new, york in the city field, instead of corresponding to the first sequential node in the city trie 202, which is associated with 4 records that store the value new in the city field, because the second sequential node in the organization name trie 200 corresponds to the second sequential node in the city trie 202. However, if the 2 records in this example stored new york and chicago in the 2 city fields, then the second sequential node which follows the branch sequence national, institute, in the organization name trie 200 is associated with 2 records that correspond to the second sequential node in the city trie 202, which is associated with 1 record that stores the value new, york in the city field, and correspond to the first sequential node in the city trie 202, which is associated with 1 record that stores the value chicago in the city field. A same node depth can be a distance that a connecting point in a tree or trie is below the originating point of the tree or trie that is identical to another distance that another connecting point in the tree or trie is below the originating point of the tree or trie.

When tries are finished being built and augmented, a branch sequence in the third trie is optionally identified as a match key for a prospective record, based on a prospective value stored in the third field by the prospective record, block 308. The system identifies a branch sequence in a trie as a match key for matching a prospective record. For example, and without limitation, this can include the database system identifying the national, institute branch sequence in the organization name trie 200 as a match key for the prospective record that stores the organization name The National Institute of Hlth, the city New York, and the phone number 212-259-6000. A prospective record can be at least one stored value that could potentially be stored in a database or dataset. A prospective value can be a symbol that could potentially be stored in a database, or dataset, of records.

Identifying the branch sequence as the match key for the prospective record may include tokenizing the prospective value stored in the third field by the prospective record; identifying each node, beginning from a root of the third trie, corresponding to a token value sequence associated with the tokenized prospective value, until a node is identified that stores a count that is less than a node threshold; and identifying a match key associated with the identified node as the match key for the prospective record. For an example of identifying the match key for the prospective record, the database system tokenizes the organization name National Institute of Hlth as <national, institute, of, hlth> for a prospective record during a lookup phase. Continuing the example of identifying the match key for the prospective record, the database system can use the tokenized values national, institute, of filth to identify that a first sequential node stores the count 4 for the token value sequence national, and stop after identifying that a second sequential node stores the count 2 for the token value sequence national, institute, because this second sequential node's count 2 is less than the threshold count of 2.5 Completing the example of identifying the match key for the prospective record, the database system can identify the branch sequence national, institute as the match key for the prospective record that stores the organization name National Institute of Hlth.

The system may identify a branch sequence in a trie as a match key for matching a prospective record based on a post-list size associated with the branch sequence. For example, after the database system receives a prospective record that stores the value starbucks in the organization name field, stores the value new york in the city field, and the value 212-628-1844 in the phone number field, the database system identifies that the starbucks match key's post-list size is 20,000 records, the new york match key's post-list size is 5,000 records, and the 212-628 match key's post-list size is 25,000 records. Then the database system can sort these post-list sizes in non-decreasing order. For example, the database system sorts these post-list sizes as 5,000 for the new york match key, 20,000 for the starbucks match key, and 25,000 for the 212 match key. In this example, the database system identifies the new york match key in a city trie for the initial attempt to shallow match the potential record.

When the database system identifies the match key associated with the identified node as the match key for the prospective record, the database system may also create a transposed match key for the prospective record by exchanging adjacent tokens in the match key for the prospective record, create a substitution based match key for the prospective record by substituting a placeholder for a token in the match key for the prospective record, create an insertion based match key for the prospective record by inserting a placeholder in the match key for the prospective record, and/or create a deletion based match key for the prospective record by deleting a token in the match key for the prospective record. For example, when the database system identifies 515123 as the match key for the database record that stores the telephone number 515-123-4568, the database system also creates the transposed match key 551123, the substitution based match key 595123, the insertion based match key 5015123, and the deletion based match key 51523 for the database record that stores the telephone number 515-123-4568. Creating fuzzy variations of match keys for database records and for prospective records enables the database system to match these records even when the database records and/or the prospective records include errors. Although this example illustrates the database system creating one of each type of fuzzy variation match key for the match key, the database system may create any number of each type of fuzzy variation match key for the match key. For example, if the database system has a fuzzy variation budget of 12,000,000 and stores 1,000,000 records, then the database system creates a total of 12 fuzzy variations (12,000,000 divided by 1,000,000) for each match key, such as creating 3 transposed match keys, 3 substitution based match keys, 3 insertion based match keys, and 3 deletion based match keys for each match key.

After the match key is identified for the prospective record, the match key is used to optionally identify a subset of the multiple records, which match the prospective record, block 310. The system can shallow match database records to the prospective record. By way of example and without limitation, this can include the database system using the national, institute match key to identify 200 database records associated with the node in the organization name trie 200 that follow the branch sequence national, institute as shallow matches for the prospective record that stores the organization name The National Institute of Hlth. Matching records can be stored values that correspond to each other in some essential respect.

If a count of the subset exceeds a threshold, a branch sequence in the first trie or the second trie is optionally identified as another match key for a prospective record, based on the first dispersion measure and the second dispersion measure, block 312. The system can use another match key to identify shallow matches for the prospective record if the number of the initially identified shallow matches is too many for applying the intensive multi-value matching process, In embodiments, this can include the database system identifying the 212-259 branch sequence in the phone number trie 204 as another match key for the prospective record, because the entropy of 1.0 for the phone number field's values is greater than the entropy of 0.0 for the city field's values, since the count of the 200 database records exceeds the threshold count of 100. If the count of the subset does not exceed the threshold, the database system can use the match key to identify a record that matches the prospective record. A threshold can be the magnitude or intensity that must be met or exceeded for a certain reaction, phenomenon, result, or condition to occur or be manifested.

Once the other match key is identified for the prospective record, the key and the other key are optionally used to identify a record, of the subset, that matches the prospective record, block 314. The system can identify a reduced number of database records that shallow match the prospective record. For example, and without limitation, this can include the database system using the national, institute match key for the organization name trie 200 and the 212-259 match key for the phone number trie 204 to shallow match and subsequently identify the database record that stores the organization name National Institute of Health and the phone number 212-259-6000 as matching the prospective record that stores the organization name The National Institute of Hlth and the phone number 212-259-6000. The database system may use the national, institute match key for the organization name trie 200 and the 212-259 match key for the phone number trie 204 because the database system estimates that using the national, institute match key for the organization name trie 200 and the 212-259 match key for the phone number trie 204 would identify 100 database records that store organization names which begin with National Institute and phone number which begin with 212-259 as shallow matching the prospective record that stores the organization name The National Institute of Hlth and the phone number 212-259-6000.

If an estimated count of the multiple records that match the prospective record, based on the count of the subset and a dispersion measure corresponding to the other match key, does not exceed the threshold, identifying the record of the subset that matches the prospective record may be based on using only the match key and the other match key for the prospective record. For example, the database system estimates the count of shallow matches for the prospective record based on the previously described formula $n_i(p_1)*1/2^{H1(p1, j, l)} \leq m$, where $n_i(p_i)$ denotes the count on the node $p_i$ of this prefix in trie $T_i$. Since the node that follows the branch sequence national, institute in the organization name trie 200 is associated with 200 records, the entropy H1(p1, j, l) is 1.0, and the threshold is 100 records, the formula becomes an estimated 200 records*$(1/2^{1.0}) \leq$ the threshold of 100 records, which becomes 100 estimated records≤the threshold of 100 records. Since the estimated 100 records does not exceed the threshold of 100 records, the database system may use only the national, institute match key for the organization name trie 200 and the 212-259 match key for the phone number trie 204 to shallow match and subsequently identify the database record that stores the organization name National Institute of Health and the phone number 212-259-6000 as matching the prospective record that stores the organization name The National Institute of Hlth and the phone number 212-259-6000. If the estimated count of the multiple records that match the prospective record exceeds the threshold, identifying the record of the subset, which matches the prospective record may be further based on using an additional match key for the prospective record. For example, if the estimated count exceeded the threshold of 100 records, the database system may use another match key, such as a city match key or a zip code match key, in addition to using the organization name match key and the telephone number match key to identify records that shallow match the prospective record. The database system previously used the dispersion measures between the values stored by the organization name trie 200 and the values stored by the telephone number trie 204 and the values stored by the city trie 202 to determine whether to identify the second match key from the telephone number trie 204 or the city trie 202. Similarly, the database system may use the dispersion measures between the values stored by the organization name trie 200 and the values stored by the zip code trie and the values stored by the city trie 202 along with the dispersion measures between the values stored by the telephone number trie 204 and the values stored by the zip code trie and the values stored by the city trie 202 to determine whether to identify the third match key from the zip code trie or the city trie 202. An estimated count can be an arithmetical value, expressed by a word, symbol, or figure, representing a particular quantity and used in making calculations and for showing order in a series or for identification.

The method 300 may be repeated as desired. Although this disclosure describes the blocks 302-314 executing in a particular order, the blocks 302-314 may be executed in a different order. In other implementations, each of the blocks 302-314 may also be executed in combination with other blocks and/or some blocks may be divided into a different set of blocks.

System Overview

Figure 4:
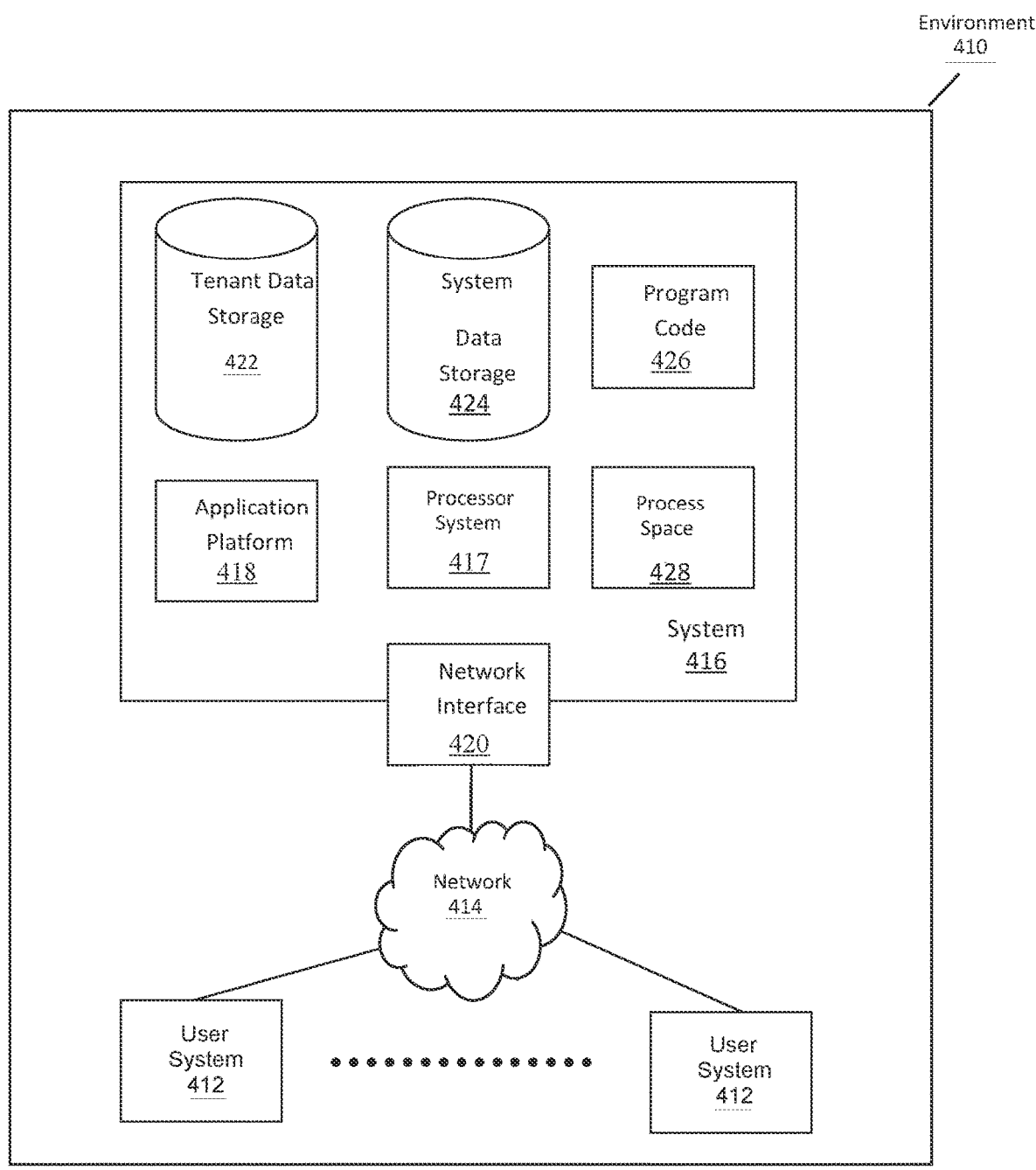
FIG. 4 illustrates a block diagram of an example of an environment wherein an on-demand database service might be used.

FIG. 4 illustrates a block diagram of an environment 410 wherein an on-demand database service might be used. The environment 410 may include user systems 412, a network 414, a system 416, a processor system 417, an application platform 418, a network interface 420, a tenant data storage 422, a system data storage 424, program code 426, and a process space 428. In other embodiments, the environment 410 may not have all of the components listed and/or may have other elements instead of, or in addition to, those listed above.

The environment 410 is an environment in which an on-demand database service exists. A user system 412 may be any machine or system that is used by a user to access a database user system. For example, any of the user systems 412 may be a handheld computing device, a mobile phone, a laptop computer, a workstation, and/or a network of computing devices. As illustrated in FIG. 4 (and in more detail in FIG. 5) the user systems 412 might interact via the network 414 with an on-demand database service, which is the system 416.

An on-demand database service, such as the system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 416" and the "system 416" will be used interchangeably herein. A database image may include one or more database objects. A relational database management system (RDMS) or the equivalent may execute storage and retrieval of information against the database object(s). The application platform 418 may be a framework that allows the applications of the system 416 to run, such as the hardware and/or software, e.g., the operating system. In an embodiment, the on-demand database service 416 may include the application platform 418 which enables creation, managing and executing one or more applications developed by the provider of the on-demand database service, users accessing the on-demand database service via user systems 412, or third party application developers accessing the on-demand database service via the user systems 412.

The users of the user systems 412 may differ in their respective capacities, and the capacity of a particular user system 412 might be entirely determined by permissions (permission levels) for the current user. For example, where a salesperson is using a particular user system 412 to interact with the system 416, that user system 412 has the capacities allotted to that salesperson. However, while an administrator is using that user system 412 to interact with the system 416, that user system 412 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 414 is any network or combination of networks of devices that communicate with one another. For example, the network 414 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 412 might communicate with the system 416 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 416. Such an HTTP server might be implemented as the sole network interface between the system 416 and the network 414, but other techniques might be used as well or instead. In some implementations, the interface between the system 416 and the network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 416, shown in FIG. 4, implements a web-based customer relationship management (CRM) system. For example, in one embodiment, the system 416 includes application servers configured to implement and execute CRM software applications as well as provide related data, code, forms, webpages and other information to and from the user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 416 implements applications other than, or in addition to, a CRM application. For example, the system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of the system 416 is shown in FIG. 4, including the network interface 420, the application platform 418, the tenant data storage 422 for tenant data 423, the system data storage 424 for system data 425 accessible to the system 416 and possibly multiple tenants, the program code 426 for implementing various functions of the system 416, and the process space 428 for executing MTS system processes and tenant-specific processes, such as running applications as part of an application hosting service. Additional processes that may execute on the system 416 include database indexing processes.

Several elements in the system shown in FIG. 4 include conventional, well-known elements that are explained only briefly here. For example, each of the user systems 412 could include a desktop personal computer, workstation, laptop, PDA, cell phone, or any wireless access protocol (WAP) enabled device or any other computing device capable of interfacing directly or indirectly to the Internet or other network connection. Each of the user systems 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 412 to access, process and view information, pages and applications available to it from the system 416 over the network 414. Each of the user systems 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 416 or other systems or servers. For example, the user interface device may be used to access data and applications hosted by the system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 412 and all of its components are operator configurable using applications, such as a browser, including computer code run using a central processing unit such as an Intel Pentium® processor or the like. Similarly, the system 416 (and additional instances of an MTS, where more than one is present) and all of their components might be operator configurable using application(s) including computer code to run using a central processing unit such as the processor system 417, which may include an Intel Pentium® processor or the like, and/or multiple processor units. A computer program product embodiment includes a machine-readable storage medium (media) having instructions stored thereon/ in which may be used to program a computer to perform any of the processes of the embodiments described herein. Computer code for operating and configuring the system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/ IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 416 is configured to provide webpages, forms, applications, data and media content to the user (client) systems 412 to support the access by the user systems 412 as tenants of the system 416. As such, the system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 5:
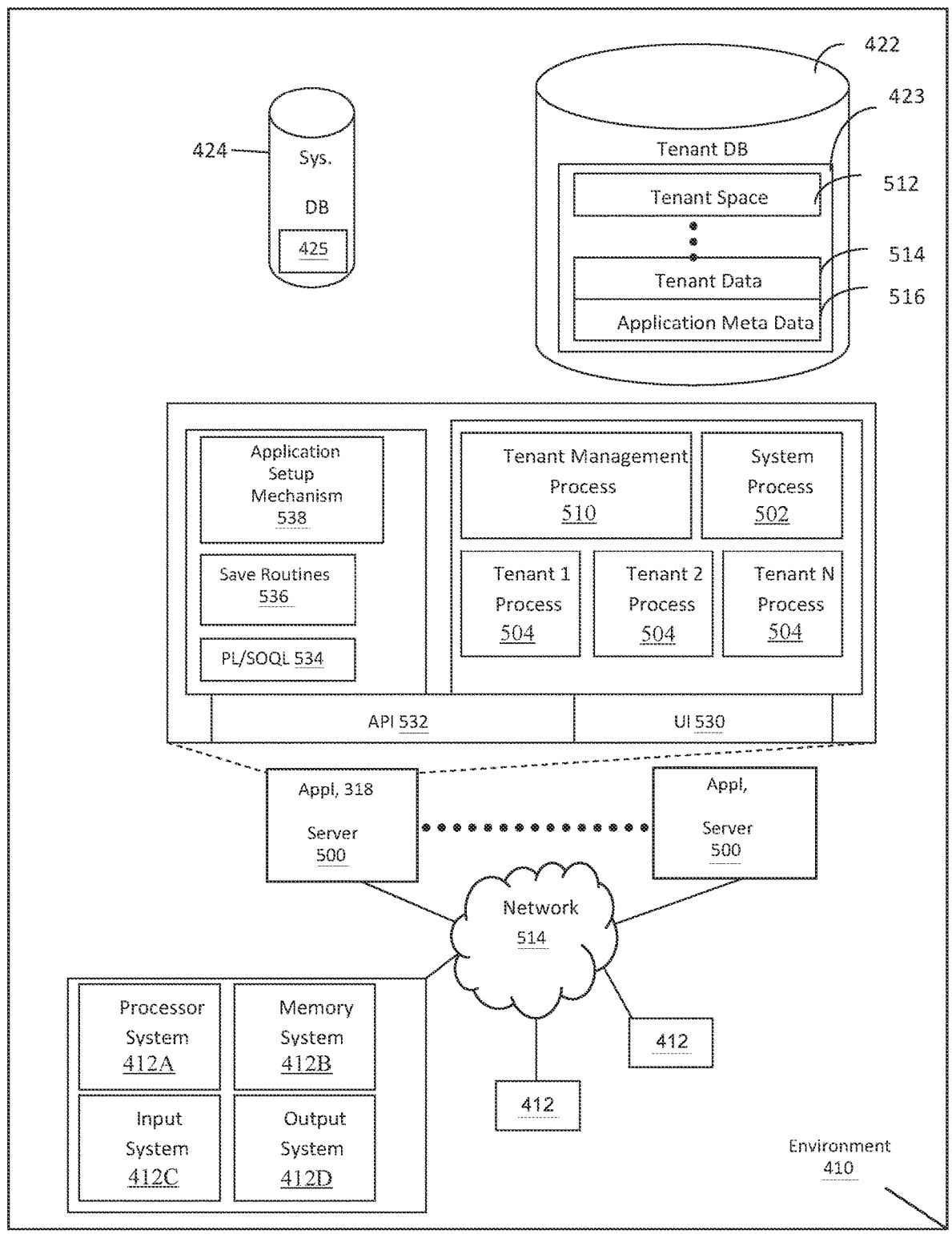
FIG. 5 illustrates a block diagram of an embodiment of elements of FIG. 3 and various possible interconnections between these elements.

FIG. 5 also illustrates the environment 410. However, in FIG. 5 elements of the system 416 and various interconnections in an embodiment are further illustrated. FIG. 5 shows that the each of the user systems 412 may include a processor system 412A, a memory system 412B, an input system 412C, and an output system 412D. FIG. 5 shows the network 414 and the system 416. FIG. 5 also shows that the system 416 may include the tenant data storage 422, the tenant data 423, the system data storage 424, the system data 425, a User Interface (UI) 530, an Application Program Interface (API) 532, a PL/SOQL 534, save routines 536, an application setup mechanism 538, applications servers 500₁-500N, a system process space 502, tenant process spaces 504, a tenant management process space 510, a tenant storage area 512, a user storage 514, and application metadata 516. In other embodiments, the environment 410 may not have the same elements as those listed above and/or may have other elements instead of, or in addition to, those listed above.

The user systems 412, the network 414, the system 416, the tenant data storage 422, and the system data storage 424 were discussed above in FIG. 4. Regarding the user systems 412, the processor system 412A may be any combination of one or more processors. The memory system 412B may be any combination of one or more memory devices, short term, and/or long term memory. The input system 412C may be any combination of input devices, such as one or more keyboards, mice, trackballs, scanners, cameras, and/or interfaces to networks. The output system 412D may be any combination of output devices, such as one or more monitors, printers, and/or interfaces to networks. As shown by FIG. 5, the system 416 may include the network interface 420 (of FIG. 4) implemented as a set of HTTP application servers 500, the application platform 418, the tenant data storage 422, and the system data storage 424. Also shown is the system process space 502, including individual tenant process spaces 504 and the tenant management process space 510. Each application server 500 may be configured to access tenant data storage 422 and the tenant data 423 therein, and the system data storage 424 and the system data 425 therein to serve requests of the user systems 412. The tenant data 423 might be divided into individual tenant storage areas 512, which may be either a physical arrangement and/or a logical arrangement of data. Within each tenant storage area 512, the user storage 514 and the application metadata 516 might be similarly allocated for each user. For example, a copy of a user's most recently used (MRU) items might be stored to the user storage 514. Similarly, a copy of MRU items for an entire organization that is a tenant might be stored to the tenant storage area 512. The UI 530 provides a user interface and the API 532 provides an application programmer interface to the system 416 resident processes to users and/or developers at the user systems 412. The tenant data and the system data may be stored in various databases, such as one or more Oracle™ databases.

The application platform 418 includes the application setup mechanism 538 that supports application developers' creation and management of applications, which may be saved as metadata into the tenant data storage 422 by the save routines 536 for execution by subscribers as one or more tenant process spaces 504 managed by the tenant management process 510 for example. Invocations to such applications may be coded using the PL/SOQL 534 that provides a programming language style interface extension to the API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 516 for the subscriber making the invocation and executing the metadata as an application in a virtual machine.

Each application server 500 may be communicably coupled to database systems, e.g., having access to the system data 425 and the tenant data 423, via a different network connection. For example, one application server 500₁ might be coupled via the network 414 (e.g., the Internet), another application server 500$_{N-1}$ might be coupled via a direct network link, and another application server 500$_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also may be used. For example, in certain embodiments, three consecutive requests from the same user could hit three different application servers 500, and three requests from different users could hit the same application server 500. In this manner, the system 416 is multi-tenant, wherein the system 416 handles storage of, and access to, different objects, data and applications across disparate users and organizations.

As an example of storage, one tenant might be a company that employs a sales force where each salesperson uses the system 416 to manage their sales process. Thus, a user might maintain contact data, leads data, customer follow-up data, performance data, goals and progress data, etc., all applicable to that user's personal sales process (e.g., in the tenant data storage 422). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 416 might also maintain system level data usable by multiple tenants or other data. Such system level data might include industry reports, news, postings, and the like that are sharable among tenants.

In certain embodiments, the user systems 412 (which may be client systems) communicate with the application servers 500 to request and update system-level and tenant-level data from the system 416 that may require sending one or more queries to the tenant data storage 422 and/or the system data storage 424. The system 416 (e.g., an application server 500 in the system 416) automatically generates one or more SQL statements (e.g., one or more SQL queries) that are designed to access the desired information. The system data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for adaptive match indexes, the system comprising:
one or more processors; and
a non-transitory computer readable medium storing a plurality of instructions, which when executed, cause the one or more processors to:
determine a first count of first records that store a first value in a first field, a second count of second records that store a second value in a second field, and a third count of third records that store a third value in a third field;
determine a count threshold based on at least the first count, the second count, and the third count;
determine a dispersion measure based on a dispersion of values stored in the second field by the first records, and an other dispersion measure based on a n other dispersion of values stored in the third field by the first records,
train a machine-learning model to determine a dispersion measure threshold based on at least the dispersion measure and the other dispersion measure;
determine whether the first count is greater than the count threshold;
determine whether the dispersion measure is greater than the dispersion measure threshold, in response to a determination that the first count is greater than the count threshold;
create a match index based on the first field and the second field, in response to a determination that the dispersion measure is greater than the dispersion measure threshold; and
identify, by using the match index, at least one record which stores the first value in the first field and the second value in the second field as matching a prospective record, and use at least one field of data from the prospective record to update the record that matches the prospective record in response to receiving the prospective record that stores the first value in the first field and the second value in the second field.

2. The system of claim 1, wherein the count threshold is one of learned by another machine learning model and based on historical data associated with recall and precision of match indexes used to match records.

3. The system of claim 1, wherein the plurality of instructions when executed further causes the one or more processors to:
determine whether the dispersion measure is greater than any other dispersion measure associated with the first records, in response to a determination that the dispersion measure is not greater than the dispersion measure threshold; and
create the match index based on the first field and the second field, in response to a determination that the dispersion measure is greater than any other dispersion measure associated with the first records.

4. The system of claim 1, wherein identifying, by using the match index, at least one record which stores the first value in the first field and the second value in the second field as matching the prospective record comprises using the match index to create a match key based on the first value and the second value, and using the match key to match at least one record to the prospective record.

5. The system of claim 1, wherein identifying, by using the match index, at least one record which stores the first value in the first field and the second value in the second field as matching the prospective record comprises selecting use of the match index instead of an alternative match index, the selecting being based on a weight associated with the match index and an alternative weight associated with the alternative match index, the weight being based on the first count relative to the dispersion measure.

6. The system of claim 1, wherein the plurality of instructions when executed further causes the one or more processors to:

create an other match index based on the first field, in response to a determination that the first count is not greater than the count threshold; and identify, by using the other match index, at least one record which stores the first value in the first field as matching an other prospective record, in response to receiving the other prospective record that stores the first value in the first field.

7. The system of claim 6, wherein the plurality of instructions when executed further causes the one or more processors to:

determine whether the dispersion measure is greater than the dispersion measure threshold, in response to a determination that the first count is not greater than the count threshold; and create an additional match index based on the second field, in response to a determination that the dispersion measure is greater than the dispersion measure threshold.

8. A computer program product comprising a non-transitory computer-readable medium having computer-readable program code embodied thereon to be executed by one or more processors, the program code including instructions to:

determine a first count of first records that store a first value in a first field, a second count of second records that store a second value in a second field, and a third count of third records that store a third value in a third field;

determine a count threshold based on at least the first count, the second count, and the third count;

determine a dispersion measure based on a dispersion of values stored in the second field by the first records, and an other dispersion measure based on an other dispersion of values stored in the third field by the first records, train a machine-learning model to determine a dispersion measure threshold based on at least the dispersion measure and the other dispersion measure;

determine whether the first count is greater than the count threshold;

determine whether the dispersion measure is greater than the dispersion measure threshold, in response to a determination that the first count is greater than the count threshold;

create a match index based on the first field and the second field, in response to a determination that the dispersion measure is greater than the dispersion measure threshold; and identify, by using the match index, at least one record which stores the first value in the first field and the second value in the second field as matching a prospective record, and use at least one field of data from the prospective record to update the record that matches the prospective record in response to receiving the prospective record that stores the first value in the first field and the second value in the second field.

9. The computer program product of claim 8, wherein the count threshold is one of learned by another machine learning model and based on historical data associated with recall and precision of match indexes used to match records.

10. The computer program product of claim 8, wherein the program code includes further instructions to:

determine whether the dispersion measure is greater than any other dispersion measure associated with the first records, in response to a determination that the dispersion measure is not greater than the dispersion measure threshold; and create the match index based on the first field and the second field, in response to a determination that the dispersion measure is greater than any other dispersion measure associated with the first records.

11. The computer program product of claim 8, wherein identifying, by using the match index, at least one record which stores the first value in the first field and the second value in the second field as matching the prospective record comprises using the match index to create a match key based on the first value and the second value, and using the match key to match at least one record to the prospective record.

12. The computer program product of claim 8, wherein identifying, by using the match index, at least one record which stores the first value in the first field and the second value in the second field as matching the prospective record comprises selecting use of the match index instead of an alternative match index, the selecting being based on a weight associated with the match index and an alternative weight associated with the alternative match index, the weight being based on the first count relative to the dispersion measure.

13. The computer program product of claim 8, wherein the program code includes further instructions to:

create an other match index based on the first field, in response to a determination that the first count is not greater than the count threshold; and identify, by using the other match index, at least one record which stores the first value in the first field as matching an other prospective record, in response to receiving the other prospective record that stores the first value in the first field.

14. The computer program product of claim 13, wherein the program code includes further instructions to:

determine whether the dispersion measure is greater than the dispersion measure threshold, in response to a determination that the first count is not greater than the count threshold; and create an additional match index based on the second field, in response to a determination that the dispersion measure is greater than the dispersion measure threshold.

15. A computer-implemented method for adaptive match indexes, the computer-implemented method comprising:

determining a first count of first records that store a first value in a first field, a second count of second records that store a second value in a second field, and a third count of third records that store a third value in a third field;

determining a count threshold based on at least the first count, the second count, and the third count;

determining a dispersion measure based on a dispersion of values stored in the second field by the first records, and another dispersion measure based on another dispersion of values stored in the third field by the first records, training a machine-learning model to determine a dispersion measure threshold based on at least the dispersion measure and the other dispersion measure;

determining whether the first count is greater than the count threshold;

determining whether the dispersion measure is greater than the dispersion measure threshold, in response to a determination that the first count is greater than the count threshold;

creating a match index based on the first field and the second field, in response to a determination that the dispersion measure is greater than the dispersion measure threshold; and identifying, by using the match index, at least one record which stores the first value in the first field and the second value in the second field as matching a prospective record, and use at least one field of data from the prospective record to update the record that matches the prospective record in response to receiving the prospective record that stores the first value in the first field and the second value in the second field.

16. The computer-implemented method of claim 15, wherein the count threshold is one of learned by another machine learning model and based on historical data associated with recall and precision of match indexes used to match records.

17. The computer-implemented method of claim 15, wherein the computer-implemented method further comprises:

determining whether the dispersion measure is greater than any other dispersion measure associated with the first records, in response to a determination that the dispersion measure is not greater than the dispersion measure threshold; and creating the match index based on the first field and the second field, in response to a determination that the dispersion measure is greater than any other dispersion measure associated with the first records.

18. The computer-implemented method of claim 15, wherein identifying, by using the match index, at least one record which stores the first value in the first field and the second value in the second field as matching the prospective record comprises at least one of using the match index to create a match key based on the first value and the second value and using the match key to match at least one record to the prospective record, and selecting use of the match index instead of an alternative match index, the selecting being based on a weight associated with the match index and an alternative weight associated with the alternative match index, the weight being based on the first count relative to the dispersion measure.

19. The computer-implemented method of claim 15, wherein the computer-implemented method further comprises:

creating another match index based on the first field, in response to a determination that the first count is not greater than the count threshold; and identifying, by using the other match index, at least one record which stores the first value in the first field as matching another prospective record, in response to receiving the other prospective record that stores the first value in the first field.

20. The computer-implemented method of claim 15, wherein the computer-implemented method further comprises:

determining whether the dispersion measure is greater than the dispersion measure threshold, in response to a determination that the first count is not greater than the count threshold; and creating an additional match index based on the second field, in response to a determination that the dispersion measure is greater than the dispersion measure threshold.

\* \* \* \* \*